(12) United States Patent
Kroeger et al.

(10) Patent No.: US 8,868,644 B2
(45) Date of Patent: Oct. 21, 2014

(54) MECHANISM FOR MESSAGE PREFETCHING IN AN INTERMITTENTLY CONNECTED OFFLINE-CAPABLE MOBILE WEB APPLICATION

(75) Inventors: Robert Kroeger, Waterloo (CA); Andrew Grieve, Waterloo (CA); Bikin Chiu, Mississauga (CA); Alex Nicolaou, Waterloo (CA); Matthew Bolohan, Waterloo (CA)

(73) Assignee: Google Inc., Mountain View, CA (US)

(*) Notice: Subject to any disclaimer, the term of this patent is extended or adjusted under 35 U.S.C. 154(b) by 561 days.

(21) Appl. No.: 12/946,622

(22) Filed: Nov. 15, 2010

(65) Prior Publication Data

US 2012/0124141 A1 May 17, 2012

(51) Int. Cl.
*G06F 15/16* (2006.01)
*H04L 12/58* (2006.01)

(52) U.S. Cl.
CPC ............... *H04L 51/16* (2013.01); *H04L 51/38* (2013.01)
USPC .................. 709/203; 379/201.01; 705/35

(58) Field of Classification Search
CPC ...................................................... H04L 51/16
USPC ......................................................... 709/206
See application file for complete search history.

(56) References Cited

U.S. PATENT DOCUMENTS

| | | | |
|---|---|---|---|
| 6,263,360 B1 * | 7/2001 | Arnold et al. ................. | 709/203 |
| 6,405,337 B1 | 6/2002 | Grohn et al. | |
| 7,248,978 B2 | 7/2007 | Ransom | |
| 7,395,315 B2 | 7/2008 | Colson et al. | |
| 7,826,406 B2 * | 11/2010 | Burns et al. .................. | 370/328 |
| 8,046,014 B2 * | 10/2011 | Donald et al. ................ | 455/466 |
| 8,185,589 B2 * | 5/2012 | Sundararajan et al. ....... | 709/206 |
| 2002/0049610 A1 | 4/2002 | Gropper | |
| 2003/0163537 A1 * | 8/2003 | Rohall et al. ................. | 709/206 |
| 2003/0204756 A1 | 10/2003 | Ransom et al. | |
| 2004/0098487 A1 | 5/2004 | Miller et al. | |
| 2004/0230650 A1 * | 11/2004 | Vambenepe et al. ......... | 709/204 |
| 2005/0223058 A1 * | 10/2005 | Buchheit et al. ............. | 709/203 |
| 2006/0069734 A1 * | 3/2006 | Gersh et al. .................. | 709/207 |
| 2006/0239221 A1 * | 10/2006 | Burns et al. .................. | 370/328 |
| 2007/0033569 A1 | 2/2007 | Davidson et al. | |
| 2007/0106729 A1 * | 5/2007 | Adams et al. ................ | 709/206 |
| 2008/0208992 A1 * | 8/2008 | Madnani ...................... | 709/206 |
| 2009/0036102 A1 | 2/2009 | Ho | |
| 2009/0119678 A1 | 5/2009 | Shih et al. | |
| 2009/0247134 A1 | 10/2009 | Jeide et al. | |
| 2010/0048231 A1 * | 2/2010 | Donald et al. ............... | 455/466 |
| 2010/0056187 A1 * | 3/2010 | Abuelsaad et al. .......... | 455/466 |

(Continued)

OTHER PUBLICATIONS

Google Inc., International Search Report and Written Opinion, PCT/US2011/060660, May 24, 2012, 8 pgs.

(Continued)

*Primary Examiner* — Hamza Algibhah
(74) *Attorney, Agent, or Firm* — Troutman Sanders LLP; James E. Schutz; Christopher W. Glass

(57) ABSTRACT

A request to update a list of conversations is sent to a server. At least a portion of each conversation in the list of conversations is stored on the client. A plurality of updates is received form the server. The plurality of updates includes messages corresponding to respective conversations in the list of conversations.

19 Claims, 20 Drawing Sheets

(56) References Cited

U.S. PATENT DOCUMENTS

| | | | |
|---|---|---|---|
| 2010/0070448 A1* | 3/2010 | Omoigui | 706/47 |
| 2010/0082788 A1* | 4/2010 | Mundy | 709/223 |
| 2010/0088377 A1* | 4/2010 | Johnson et al. | 709/206 |
| 2010/0257230 A1 | 10/2010 | Kroeger et al. | |
| 2011/0295958 A1* | 12/2011 | Liu et al. | 709/206 |
| 2012/0124142 A1 | 5/2012 | Kroeger et al. | |

OTHER PUBLICATIONS

Google Inc., International Search Report and Written Opinion, PCT/US2011/060659, Jun. 1, 2012, 7 pgs.

\* cited by examiner

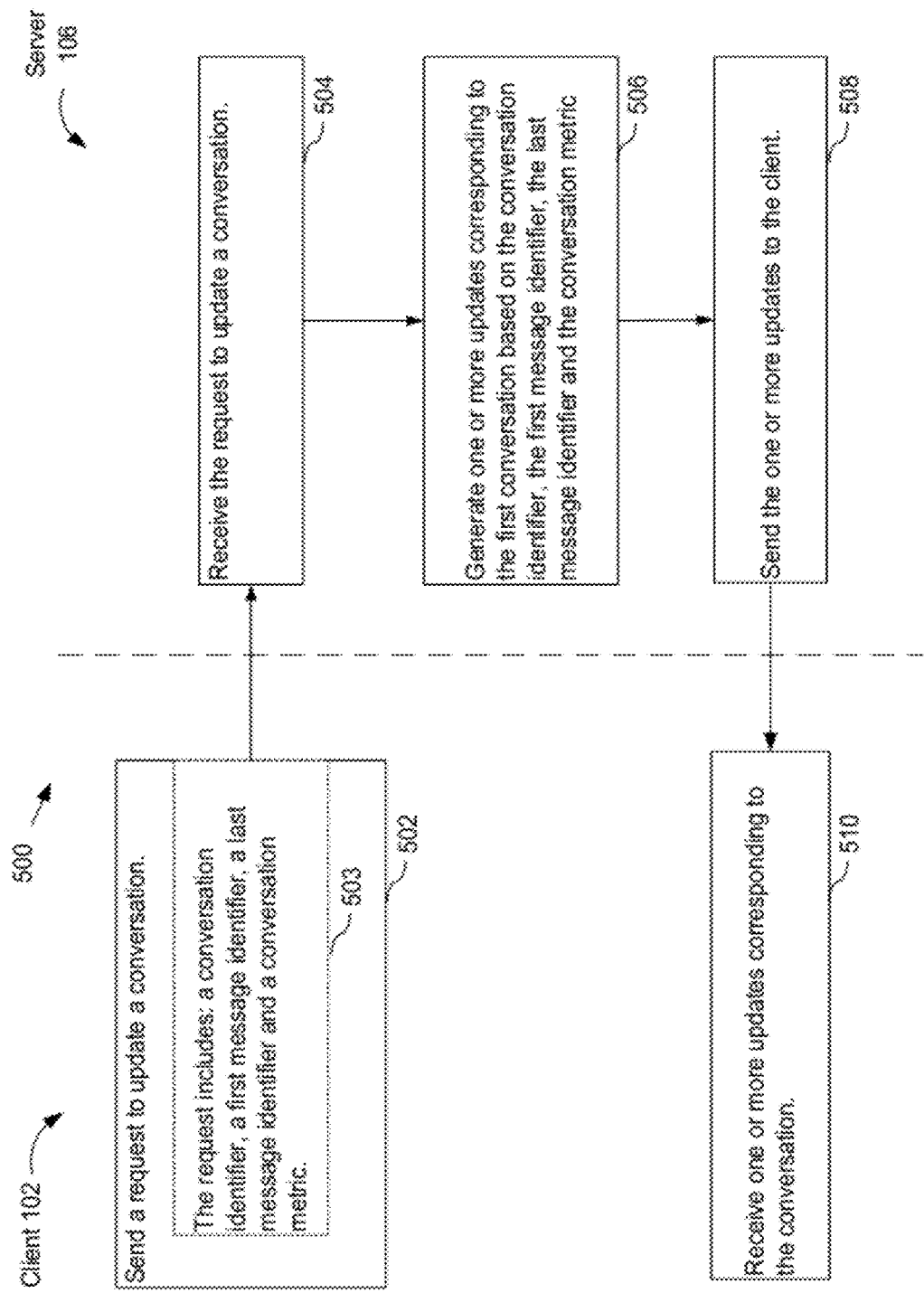

700

701 — Inbox (2)

702 — Arthur ... Doug, Gary (8)    Aug 28
Hiking at Mt. Tam Labor Day Weekend ☆

703 — Elizabeth ... Rachel, Michelle (4)    Aug 27
Dinner at Rudi's

704 — Liz ... Jess, Chris (7)    Aug 27
Plane tickets for Xmas

705 — John ... Chris, Lothar (4)    Aug 26
Basketball

722 — Message 1-6 of 7 | Inbox
Starred
More ...
724 — Plane tickets for Xmas | Search Mail
Compose Mail
726 — 6 read messages | Expand — 730
Archive
Liz | Mark as unread
to me | Report Spam
Delete
728 — So let's try to get the tickets on the same flight | Exit Gmail
then.

Let me know what flight you want to take.

Liz

FIGURE 7B

MECHANISM FOR MESSAGE PREFETCHING IN AN INTERMITTENTLY CONNECTED OFFLINE-CAPABLE MOBILE WEB APPLICATION

RELATED APPLICATIONS

This application is related to the following application: U.S. patent application Ser. No. 12/946,660, filed Nov. 15, 2010, "A light-weight method for delivering the smallest set of new messages to a conversation cache on an intermittently connected mobile email client," which application is incorporated by reference in its entirety.

TECHNICAL FIELD

The present invention relates generally to communications within computer network systems, and in particular, to a method and system for updating conversations on mobile email clients.

BACKGROUND

Many mobile devices are capable of retrieving and storing conversations and threads from email servers over a wireless network. Updating a conversation or thread on a mobile device can often be slow due to the transfer capabilities of wireless networks and expensive due to costs associated with transferring data over wireless networks.

One way to update one or more conversations or message threads on a mobile device is to transfer entire conversations to the mobile device even if only a subset of the messages in the conversations are new. Transferring entire conversations increases the time it takes to for a mobile device to receive updates, uses a large amount of bandwidth and decreases the battery life of the mobile device.

Furthermore, to update a list of conversations, a mobile device typically sends an update request for each conversation in the list resulting in an inefficient use of battery power and bandwidth.

Accordingly, it would be highly desirable to provide more efficient systems and methods for updating conversations on intermittently connected mobile email clients.

SUMMARY

The above deficiencies and other problems associated with updating conversations on mobile devices are reduced or eliminated by the disclosed methods and devices.

In accordance with some embodiments, a system and method are provided for efficiently updating conversations on mobile devices. An update request is sent to a server from a mobile device containing: a conversation identifier, a first message identifier, a last message identifier and a conversation metric. The server uses the information contained in the update request to determine and send to the mobile device the minimal amount of information necessary to bring the conversation on the mobile device up to date. An advantage of such systems and method is that less data is transferred from the server to a mobile device. In particular, for a given conversation or thread, only the new messages that that are not already on the mobile device are sent to the mobile device. Such system and method uses less bandwidth, conserves battery life and decreases the amount of time it takes to update a conversation.

In accordance with some embodiments, a system and method are provided for updating a list of conversations with a single request. A server sends a plurality of updates to a mobile device in response to receiving a single request from a mobile device. An advantage of such method and system is that the mobile device does not need to send a separate update request for each conversation in a list of conversations. Thus, by updating a list of conversations with a single update request, such systems and methods efficiently use bandwidth, battery power and decreases the amount of time it takes to update a list of conversations.

According to some embodiments, a method of updating a conversation is disclosed. The method is performed at a client having one or more processors and memory storing one or more programs to be executed by the one or more processors so as to perform the method. The method includes sending a request to update a conversation to a server. At least a portion of the conversation is stored on the client. The request includes a conversation identifier corresponding to the conversation, a first message identifier corresponding to a first message in the conversation, a last message identifier corresponding to a last message of the conversation and a conversation metric of the conversation. The method also includes receiving one or more updates from the server. The one or more updates include one or more messages corresponding to the conversation.

According to some embodiments, a method is performed at a server having one or more processors and memory storing one or more programs to be executed by the one or more processors is disclosed. The method includes receiving a request to update a first conversation from a client. A portion of the first conversation is stored on the client. The request includes a conversation identifier corresponding to the first conversation, a first message identifier corresponding to a first message in the portion of the first conversation stored on the client, a last message identifier corresponding to a last message in the portion of the first conversation stored on the client and a conversation metric of the portion of the first conversation stored on the client. The method further includes generating one or more updates corresponding to the first conversation based on the conversation identifier, the first message identifier, the last message identifier and the conversation metric. The update includes one or more messages associated with the first conversation. The method further includes sending the one or more updates to the client.

According to some embodiments, a method of updating a conversation is disclosed. The method is performed at a client having one or more processors and memory storing one or more programs to be executed by the one or more processors so as to perform the method. The method includes sending a request to update a conversation to a server. At least a portion of the conversation is stored on the client. The request includes a conversation identifier corresponding to the conversation, a first message identifier corresponding to a first message in the conversation, a last message identifier corresponding to a last message of the conversation and a conversation metric of the conversation. The method also includes receiving one or more updates from the server. The one or more updates include one or more messages corresponding to the conversation.

According to some embodiments, a method performed at a server having one or more processors and memory storing one or more programs to be executed by the one or more processors is disclosed. The method includes receiving a request to update a list of conversations from a client device. A portion of conversations in the list of conversations is stored on the client device. The method also includes generating a plurality of updates based on the request. The updates include messages corresponding to the respective conversations in the list of conversations. The method further includes sending the plurality of updates to the client device.

BRIEF DESCRIPTION OF THE DRAWINGS

FIG. 5 is a flow chart illustrating the process of updating a conversation according some embodiments.

FIGS. 7A and 7B are an exemplary screenshots according to some embodiments.

Like reference numerals refer to corresponding parts throughout the drawings.

DESCRIPTION OF EMBODIMENTS

Figure 1:
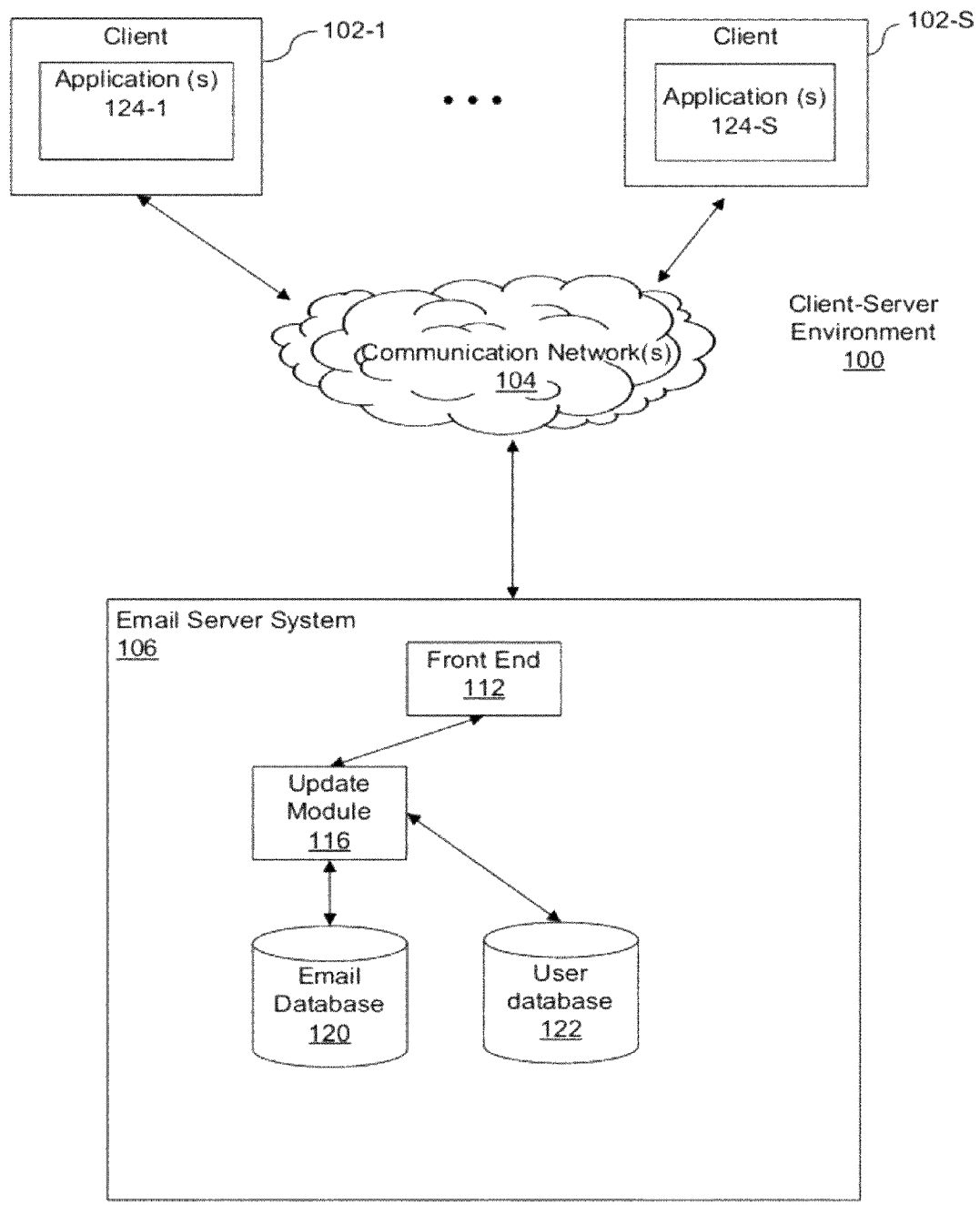
FIG. 1 is a block diagram illustrating the infrastructure of a client-server environment in accordance with some embodiments.

Methods and systems for updating conversations on mobile devices are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Several definitions are discussed below. According to some embodiments and as described in greater detail in the discussion of FIG. 4A, a conversation includes a conversation identifier, a conversation header and one or more messages. Each of the messages of a conversation includes a message header and a message body. In some embodiments, a message is an email message. A conversation should be distinguished from a reply message. While a reply message contains the text of an earlier message, a reply message is still one message. In some embodiments, a conversation is a thread of messages. In some embodiments, a list of conversations is a plurality of conversations.

A checksum is a form of redundancy check that is used to ensure data is stored or transferred without errors. More specifically, a checksum is a value determined from a piece of data that is stored with the piece of data and used to detect errors within the data. To detect errors in a block of data, a checksum is determined for the block of data and compared to the checksum stored with the block of data. In some cases error detection occurs after the block of data has been transmitted. If the checksums are the same then no errors are detected for the block of data. A non-match of the checksum values indicates an error in the block of data. As discussed in greater details herein, in the context of the present invention checksums can be used to determine that two pieces of data are identical. In some embodiments, a checksum is created by calculating the binary values in a block of data using some algorithm. In some embodiments, a checksum is calculated by adding up the bytes in block of data. Any number of algorithms can be used, for example a basic checksum may simply be the number of bytes in a file. Other examples of algorithms used to create checksums include cyclic redundancy check algorithms, hash functions Adler-32 and Fletcher's checksum.

As used herein, to prefetch means to request or load data before the data is explicitly requested by a user.

Attention is now directed to FIG. 1 which is a block diagram illustrating the infrastructure of a client-server environment 100 implemented for some of the embodiments. The client-server environment 100 includes: one or more client devices 102, a communication network 104 and a server system 106. The server system 106 is coupled to the one or more client devices 102 by the communication network 104.

It should be appreciated that the server system 106 may be implemented as a single server system or a distributed system of multiple servers. However, for convenience of explanation, the server system 106 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the one or more client devices 102 and the server system 106. In some embodiments, the communication network 104 uses the HyperText Transport Protocol (HTTP) to transport information using the Transmission Control Protocol/Internet Protocol (TCP/IP). HTTP permits client devices 102 to access various resources available via the communication network 104. The various embodiments of the invention, however, are not limited to the use of any particular protocol.

In some embodiments, the server system 106 includes a front end 112 that facilitates communication between the server system 106 and the network 104. In some embodiments, the front end 112 is configured to receive requests to update email conversations or requests to update a list of email conversations. In some embodiments, the front end 112 is configured to send updates to the client devices 102. As discussed in more detail below, the updates include new messages corresponding to one or more conversations on a client device 102. In some embodiments, the updates comprise entire conversations.

In some embodiments, the server system 106 includes an email database 120 that stores email conversations and email messages. Email messages and email conversations are described in greater detail herein. In some embodiments, the chat/document database 120 is a distributed database.

In some embodiments, the server system 106 includes an update module 116 that manages and retrieves information stored in the email database 120. As discussed in greater detail herein, the update module analyzes information in an update request and determines one or more messages stored in the email database 120 to send to a client device 102. The update module 116 is discussed in greater detail herein.

In some embodiments, the server system 106 includes a user database 122. In some embodiments, the user database 122 includes information about a user's device, transmission history and which conversations a user is associated with. The user database 122 is discussed in greater detail herein.

Figure 3:
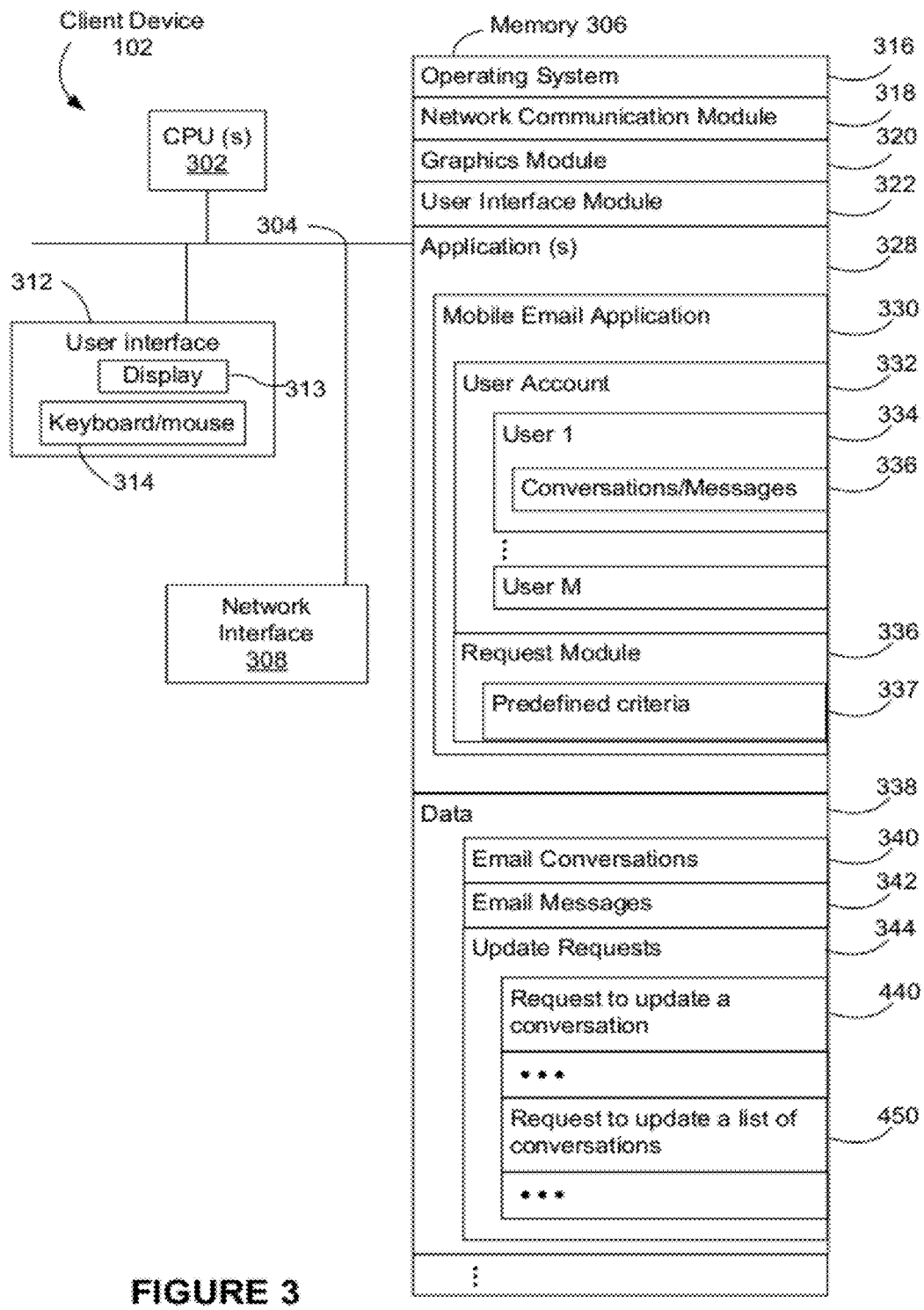
FIG. 3 is a block diagram illustrating the structure of an exemplary client device according to some embodiments.

In some embodiments, a user interfaces with the server system 106 at a client device 102. In some embodiments, the client devices 102 are portable electronic devices or mobile devices. The client devices 102 may be any suitable computer devices that are capable of connecting to the communication network 104, such as computers, desktop computers, laptop computers, tablet devices, netbooks, internet kiosks, personal digital assistants, mobile phones, gaming devices, or any other device that is capable of communicating with the server system 106. The client devices 102 typically include one or more processors, non-volatile memory such as a hard disk drive and a display. The client devices 102 may also have input devices such as a keyboard and a mouse (as shown in FIG. 3).

In some embodiments, a respective client device 102 includes one or more applications 124. In some embodiments, the one or more applications includes an email application that allows a respective user to send and receive email messages and email conversations.

Figure 2:
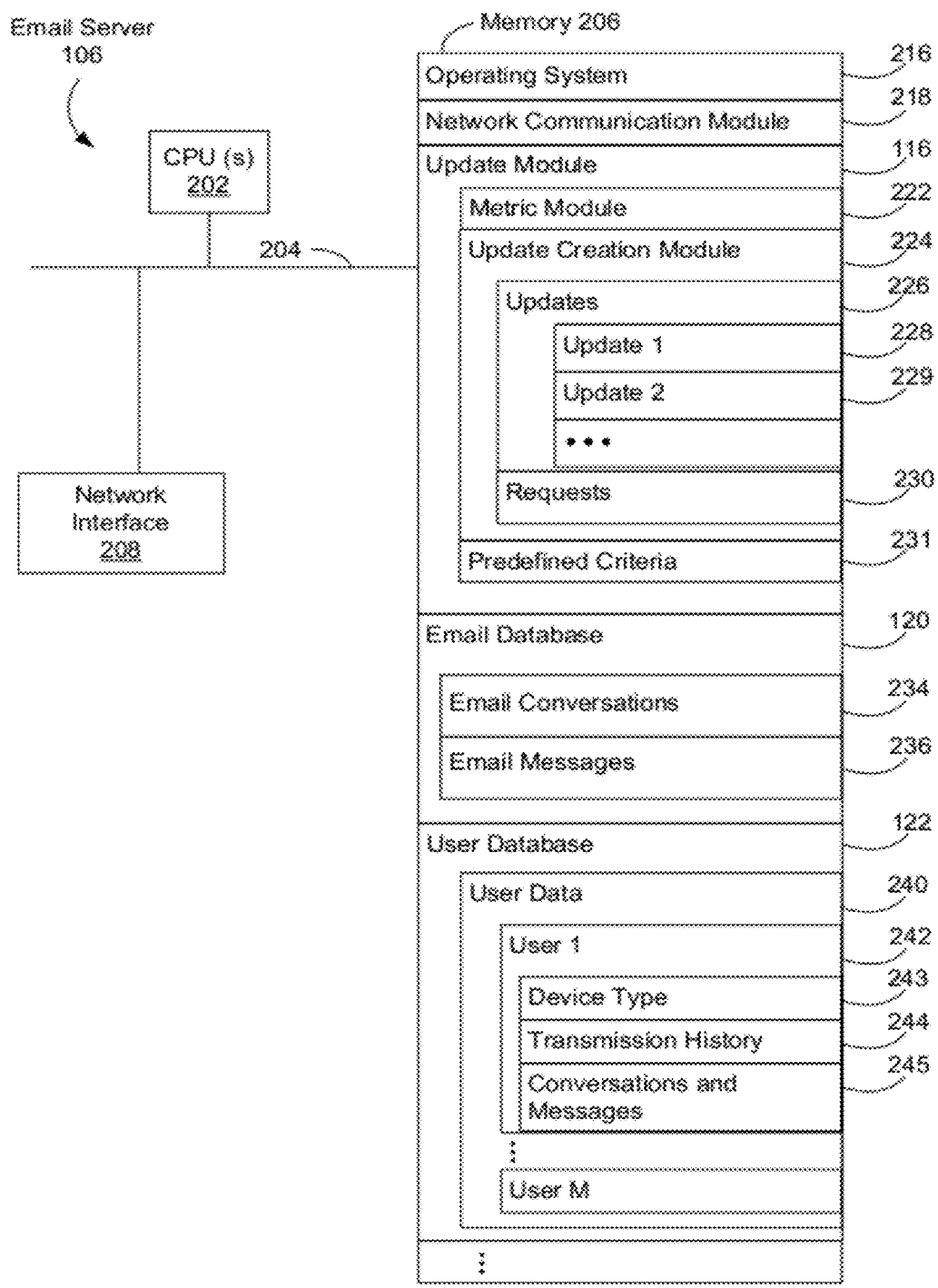
FIG. 2 is a block diagram illustrating the structure of exemplary server system according to some embodiments.

FIG. 2 is a block diagram illustrating a server system 106, in accordance with one embodiment of the present invention. The server system 106 typically includes one or more processing units (CPU's) 202, one or more network or other communications interfaces 208, memory 206, and one or more communication buses 204 for interconnecting these components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a computer readable storage medium. In some embodiments, memory 206 or the computer readable storage medium of memory 206 store the following programs, modules and data structures, or a subset thereof including an operation system 216, a network communication module 218, an update module 116, an email database 120 and a user database 122.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The email database stores email conversations 120 and email messages 236. Email conversations 234 and email message 236 are discussed in greater detail in the discussion of FIG. 4A.

User database 122 includes user data 240 for one or more users. The user data 242 for a respective user includes device information 243, transmission history 244 and associated conversations and messages 245. In some embodiments, the device information 243 identifies the type of the device used by the respective user. In some embodiments, the device information 243 indicates the model, manufacturer, operating system and transmission capabilities of a respective user's device. In some embodiments, the device information 243 includes the storage capacity of the device, the amount of free storage space on the device and the cost of data transmission associated with the user of the device. In some embodiments, the device information 243 includes restrictions on the size or type of files that the device may store. The transmission capabilities indicate how fast the respective device can transfer data. In some embodiments, the transmission history 244 includes the history of the transmission between a respective user's device and the server system 106. In some embodiments, the history 244 includes dates and time of transmissions, the name or identifier of items transmitted, the size of the items transmitted, the rate at which the items were transmitted and the type of network the items were transmitted over. In some embodiments, the history 244 includes an average transfer time of the transmissions by the respective device.

In some embodiments, the conversations and message 245 include identifiers corresponding to conversations and messages that are associated with the user. For example, conversations and messages where the respective user is a participant (i.e., a sender or receiver of a message).

The update module 116 includes a metric module 222, an update creation module 224 and predefined criteria 231. The metric module 222 determines checks on messages and conversations. In some embodiments, the metric module 222 may determine checksums on any portion of a respective message or conversation. For example, the metric module 222 may determine a checksum of a subset of message identifiers contained in a conversation. The metric module 222 is not limited to any particular method of determining checksums.

The update creation module 116 generates and stores one or more updates 226. In some embodiments, the updates 226 include one or more messages. In some embodiments, the updates 226 include one or more conversations. The updates 226 are discussed in greater detail in the discussion of FIG. 4D.

In some embodiments, the update creation module 224 accesses the user data 242 stored in the user database 122 for a respective user to generate the one or more updates 226. In some embodiments, the size and number of the one or more updates for a respective user is determined at least in part by the device information 243 and/or transmission history 244 information stored in the user database 122 for the respective user. In some embodiments, the size and number of updates is determined based on data costs, network latency, memory constraints on the client device or any combination thereof. For example, if the respective user's device is capable of storing a large amount of data (as indicated by the device information 243) then numerous updates of large sizes can be generated for the respective user. In another example, if the respective user's device is capable of storing a small amount of data then fewer and smaller updates are generated for the respective user. In another example, the user's device information 243 may indicate that the user's device imposes a limit on the size of files downloaded by the device resulting in the one or more updates being limited in size. In some embodiments, the size of the one or more updates 226 for a respective user is determined, in part, on the user's transmission history 244. For example, a user may have a stable connection and can therefore accept larger updates. On the other hand, the user may have an intermittent connection where the amount of data that can be sent to the user is limited and thus smaller updates are constructed.

In some embodiments, the composition of the one or more updates 226 for a respective user is determined at least in part predefined criteria 231 stored in the update module 116. In some embodiments, the predefined criteria gives certain messages higher priority including: unread messages, messages most recently received, messages from conversations determined to be most active among the conversations associated with the list of conversation headers, messages from senders in a same domain as the user of the client device, and messages from contacts listed in the user's address book.

In some embodiments, the update module 116 sends the one or more updates 226 at pre-defined time intervals. In some embodiments, a respective pre-defined time interval is determined based on the device information 243 and/or transmission history 244 information corresponding to the respective user. For example, the transmission history 244 for a respective user may indicate that the respective user's device is frequently able to receive data. In another example, a respective user's transmission history 244 may indicate certain periods of time where the respective user's mobile device is capable of receiving data.

In some embodiments, the update module 116 also stores one or more requests received from client devices 102. The requests are discussed in greater detail in the discussion of FIGS. 4B and 4C.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a server system, FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., operating system 216 and network communication module 218) shown separately in FIG. 2 could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

FIG. 3 is a block diagram illustrating a client device 102, in accordance with some embodiments of the present invention. The client device 102 typically includes one or more processing units (CPU's) 302, one or more network or other communications interfaces 308, memory 306, and one or more communication buses 304, for interconnecting these components. The client device 102 may also include a user interface comprising a display device 313 and a keyboard and/or mouse (or other pointing device) 314. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a computer readable storage medium. In some embodiments, client device 102 is a portable electronic device with a touch screen display. In some embodiments, memory 306 or the computer readable storage medium of memory 306 store the following programs, modules and data structures, or a subset thereof including operation system 316, network communication module 318, applications 328, a graphics module 320, a user interface module 322, applications 328 and data 338.

The operating system 316 includes procedures for handling various basic system services and for performing hardware dependent tasks.

The network communication module 318 facilitates communication with other devices via the one or more communication network interfaces 304 (wired or wireless) and one or more communication networks, such as the Internet, other wide area networks, local area networks, metropolitan area networks, and so on.

The user interface module 322 tracks user input and selections to the client device 102.

The graphics module 320 displays the user interfaces associated with the applications 328.

The data 338 includes email conversations 340, email messages 342 and update requests 344. Email conversations 340 and email messages 342 are discussed in greater detail in the discussion of FIG. 4A. Update requests 344 are discussed in greater detail in the discussion of FIGS. 4B and 4C.

In some embodiments, the applications 328 include a mobile email application 330. The mobile email application 330 enables one or more users to send and receive email messages and email conversations. In some embodiments, the mobile email application 330 stores information for one or more user accounts 332. In some embodiments, a respective user account 334 includes a list of conversation identifiers 336 and/or a list of message identifiers that correspond to conversations and/or messages associated with the respective user account 334. For example, a list of conversation identifiers may correspond to conversations where the respective user is a participant (i.e., a recipient or a sender of a message in the conversation).

In some embodiments, the mobile email application 330 includes an update module 336 that generates and sends update requests 344 to a server (e.g., FIG. 1, server 106). In some embodiments, the update requests 344 include one or more requests 440 to update a single conversation. In some embodiments, the update requests 344 include one or more requests 450 to update a list of conversations.

In some embodiments, the request module 336 includes predefined criteria 337 used to select one or more conversations from a list of conversations to update. In some embodiments, the predefined criteria includes conversations that have unread messages, conversations with messages that have been most recently received, conversations determined to be most active among the conversations associated with the list of conversation headers, conversations that include messages from senders in a same domain as the user of the client device, and conversations that include messages from contacts listed in the user's address book.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Although FIG. 3 shows a client device, FIG. 3 is intended more as functional description of the various features which may be present in a client device than as a structural schematic of the embodiments described herein. In practice, and as recognized by those of ordinary skill in the art, items shown separately could be combined and some items could be separated.

Attention is now directed to FIGS. 4A, 4B, 4C and 4D which illustrate data structures stored on the client 102 and the server system 106. The following data structures store conversations, messages, update requests and updates.

Figure 4A:
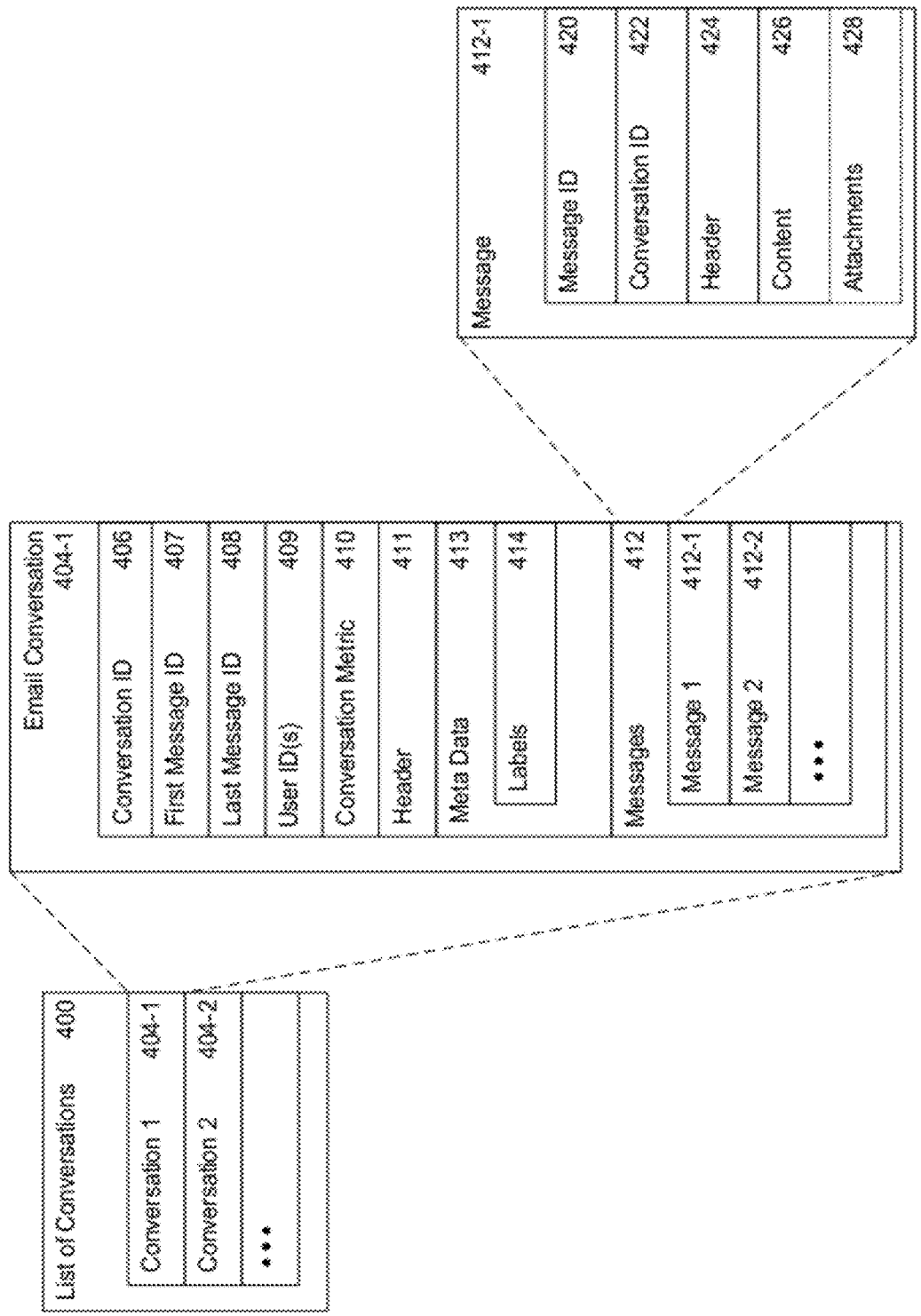
FIGS. 4A, 4B, 4C and 4D illustrate exemplary data structures according to some embodiments.

Attention is now directed to FIG. 4A, which illustrates a data structure 400 for storing a list of conversations. The list of conversations 400 includes one or more conversations 404. A respective conversation 404-1 includes a conversation identifier 406, a first message identifier 407, a last message identifier 408, one or more user identifiers 409, a conversation metric 410, a header 411, meta data 413 and one or more messages 412. In some embodiments, the list of conversations 400 is stored on the server system 106 in the email database 120. In some embodiments, the list of conversations 400 is stored on the client device 102 as data 338.

The conversation identifier 406 identifies a respective conversation 404-1. The first message identifier 407 identifies the first message in the conversation 404-1. The last message identifier 408 identifies the last message in the conversation 404-1. In some embodiments, the first message and the last message are determined by timestamps associated with the messages that indicate when the message was received or sent. In some embodiments, the first message in the conversation is the oldest message or first received in the conversation. In some embodiments, the last message identifier 408 corresponds to the most recently received message in the conversation 404-1.

The conversation metric 410 is a measurement or metric of a conversation. In some embodiments, the conversation metric 410 is a checksum of a portion of the conversation. For example, the metric 410 may be a checksum of the message identifiers of the messages 412 in the conversation 404-1. As discussed above, checksums can be used to determine whether two pieces of data are identical.

Meta data 413 includes labels 414. A label or folder is used to group conversations. For example, a label or group could be for conversations relating to vacation plans.

A respective message 412-1 includes a message identifier 420, a conversation identifier 422, header information 424, content 426 and optionally attachments 428. The message identifier 420 identifies the respective message 412. The conversation identifier 422 identifies the conversation that the respective message 412 is associated with. In some embodiments, header information 424 includes the sender email address, one or more recipient email addresses, sending timestamp, receiving timestamp and optionally timestamps of any intermediate transfer agents. The content 426 or message body of a respective message 412-1 includes text and optionally formatting information for the text.

Figures 4B, 4C:
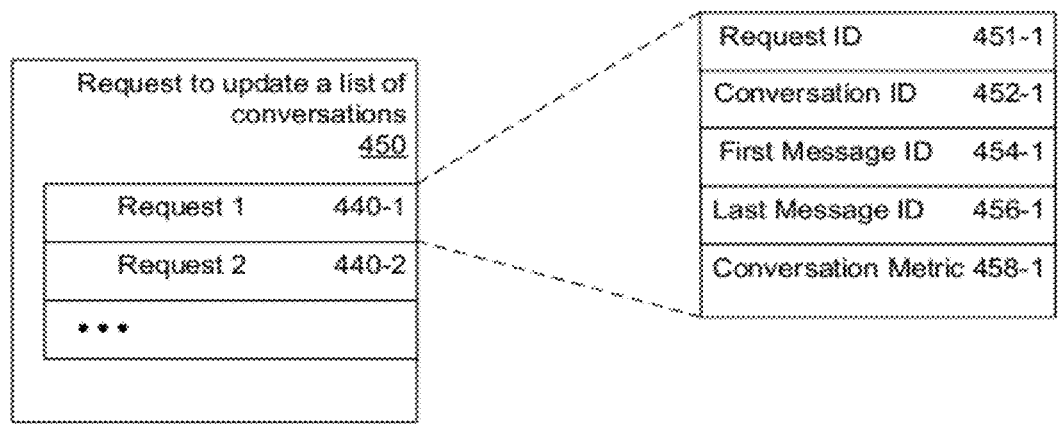

Attention is now directed to FIGS. 4B and 4C. FIG. 4B illustrates a data structure for a request to update a conversation 440. The request 440 includes information about a conversation stored on the client 102 that is to be updated. In some embodiments, the request 440 is generated by the request module 336 of a client 102. In some embodiments, one or more requests 440 are stored on the client 102 (e.g., update requests 344) and/or on the server system 106 (e.g., requests 230). The request includes a conversation identifier 442, a first message identifier 444, a last message identifier 446 and a conversation metric 448. The conversation identifier 442 identifies the conversation that is requested to be updated. The first message identifier 444 corresponds to the first message in the conversation on the client device 102. The last message identifier 446 corresponds to the last message in the conversation on the client device 102. The conversation metric 448 is a checksum of a portion of the conversation stored on the client device 102. In some embodiments, the conversation metric 448 is a checksum of message identifiers in the conversation corresponding to the conversation identifier 442.

Attention is now directed to FIG. 4C, which illustrates a request to update a list of conversations 450. The request 450 includes a list of requests 440. The requests 440 in the list of requests 450 include information about respective conversations on the client 102 that are to be updated. In some embodiments, the request 450 is generated by the request module 336 of a client 102. In some embodiments, the request 450 is stored on the client 102 (e.g., update requests 344) and/or on the server system 106 (e.g., requests 230). As discussed above, each request 440 in the list of requests 450 includes a request identifier 451, a conversation identifier 452, a first message identifier 454, a last message identifier 456 and a conversation metric 458.

Figure 4D:
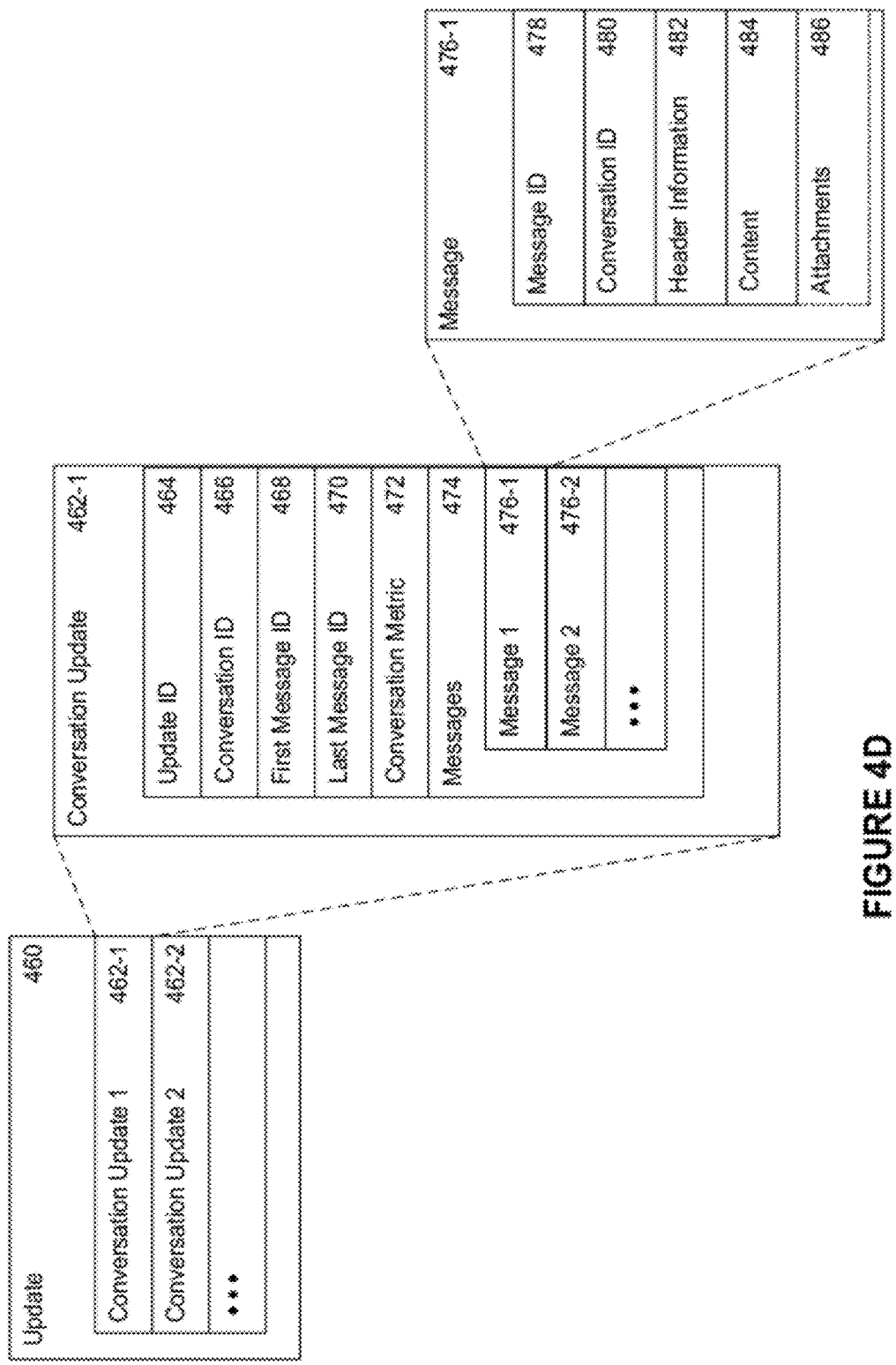

Attention is now directed to FIG. 4D, which illustrates a data structure for an update 460 in accordance with some embodiments. As discussed above, updates are sent to a client 102 from a server 106 and include information to bring respective conversations on the client 102 up to date. In some embodiments, the update 460 is generated and optionally stored by the update module 116 on the server 106. The update 460 includes conversations updates 462 for one or more conversations stored on the client 102. In some embodiments, the update 460 includes new conversations that were not previously sent to the client 102. Each conversation update 462 includes an update identifier 464, a conversation identifier 466, a first message identifier 468, a last message identifier 470, a conversation metric 472 and one or more messages 474. A respective message includes a message identifier 478, a corresponding conversation identifier 380, header information 482 and attachments 486.

Attention is now directed to FIG. 5, which is a flow diagram illustrating a process 500 of updating a conversation on a client 102, according to some embodiments. A request to update a conversation is sent from the client 102 to the server system 106. (502) In some embodiments, the request includes a conversation identifier, a first message identifier and a conversation metric. (503) The server 106 receives the request to update a conversation. (504) The server 106 generates one or more updates corresponding to the conversation based on the conversation identifier, the first message identifier, the last message identifier and the conversation metric. (506) The server sends the one or more updates (e.g., FIG. 4D, Update 460) to the client 102. (508) The client 102 receives one or more updates corresponding to the conversation. (510) In some embodiments, the one or more updates include messages in the conversation that the client 102 did not previously have.

Figure 6:
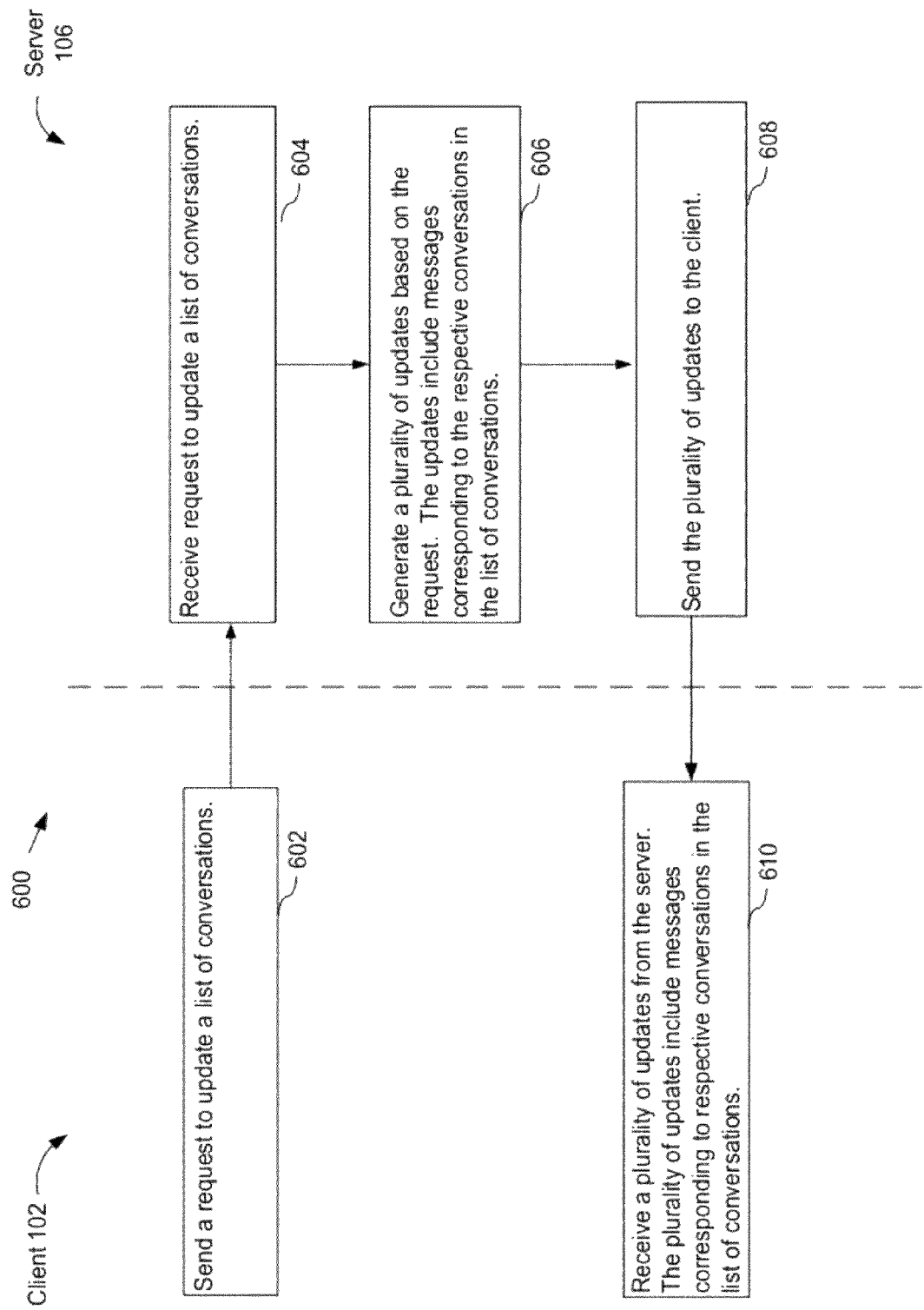
FIG. 6 is a flow chart illustrating the process of prefetching updates for a list of conversations according some embodiments.

Attention is now directed to FIG. 6, which is a flow diagram illustrating a process 600 of updating a list of conversations, according some embodiments. A request to update a list of conversations (e.g., FIG. 4C, request 450) is generated on the client 102. The request to update a list of conversation is sent from the client 102 to the server system 106. (602) In some embodiments, a single request is sent from the client 102 to the server system 106. The server system 106 receives the request to update the list of conversations. (604) The server system 106 generates a plurality of updates based on the request. (606) The updates include messages corresponding to respective conversations in the list of conversations. (606) In some embodiments, the updates include conversations that the client did not previously receive. The server 106 sends the plurality of updates to the client 102. The client 102 receives a plurality of updates from the server 106. The plurality of updates include messages corresponding to respective conversations in the list of conversations. (610)

Attention is now directed to FIGS. 7A and 7B, which illustrate exemplary screen shots according to some embodiments.

FIG. 7A shows a screen shot 700 of an exemplary inbox of an email application adapted for operating in a mobile communication device. In some embodiments, the inbox has a header 701 indicating it is an inbox, and any number of unread or new messages in the inbox. Listed in the inbox are various conversations (702, 703, 704 and 705) For example, in the illustrated embodiment, a conversation where all messages have been read (e.g., conversation 704) by the user of the mobile communication device has text with normal sized line widths and an icon for an opened envelope associated with each of these read threaded conversations. A conversation containing at least one unread message (e.g., conversation 703) has text with thicker line widths and an icon of a closed envelope associated with each of the conversation. In this conversation listing in the inbox, associated with each conversation is the number of total messages contained in a respective conversation.

FIG. 7B is a screen shot 720 of a pull down menu on a client device with a "expand" command 730 for expanding the unified header 726 in a conversation 724 in accordance with the present invention. Different methods for expanding a unified header can be provided in different embodiments; for example, by issuing a series of mouse clicks, key entries, or hovering a cursor over a particular header and pressing an enter key, a user can issue commands to expand a header. FIG. 7B shows a screen shot 720 that illustrates in mid-operation expansion by a user of a unified header 726 representing a series of collapsed cards in a modified conversation as shown in FIG. 7B To expand the unified header 726, a user first selects the unified header 726, which, in some embodiments, is highlighted when selected. In some embodiments, a user can simply hit an 'enter' key to activate the expansion action, or, in other embodiments, as shown in FIG. 7B, activate a pull down menu containing a list of different actions, and then selectively picking and activating the 'expand' 730 command. It should be appreciated that the actions listed in a pull down menu in an application may contain more or less, same or different commands as illustrated. The illustration should be viewed as exemplary but not restrictive in nature.

A Light-Weight Method for Delivering a Minimal Set of New Messages to a Conversation Cache on an Intermittently Connected Mobile Email Client The methods described herein disclose an efficient way to update a conversation with a minimal amount of transferred information thereby using less bandwidth, conserving battery life and decreasing update latency. Such methods may be particularly useful for use with mobile devices that have intermittent or unstable data connections.

Figure 8:
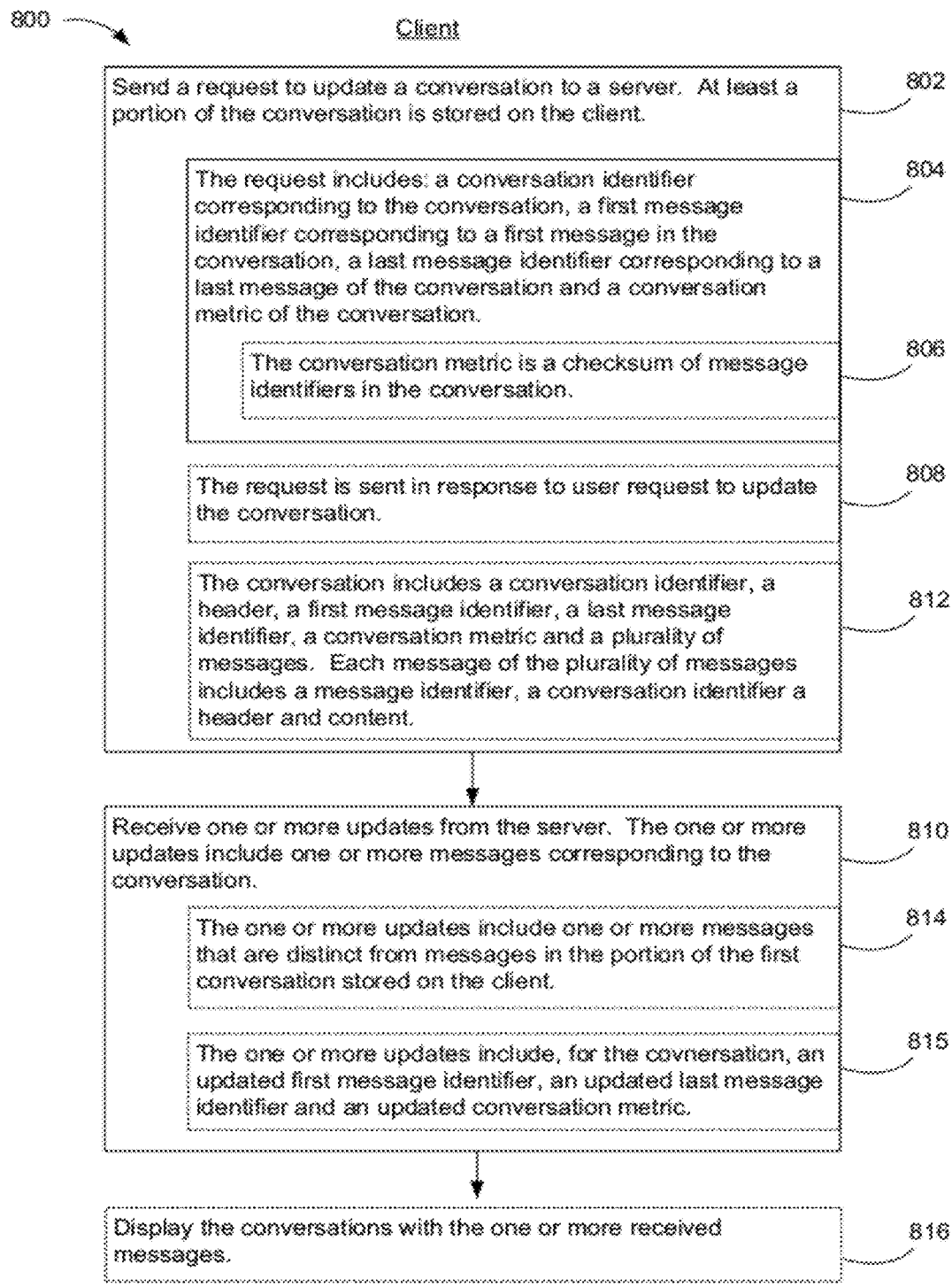
FIG. 8 is a flow chart illustrating the process of requested an conversation update at a client.
Figure 9A:
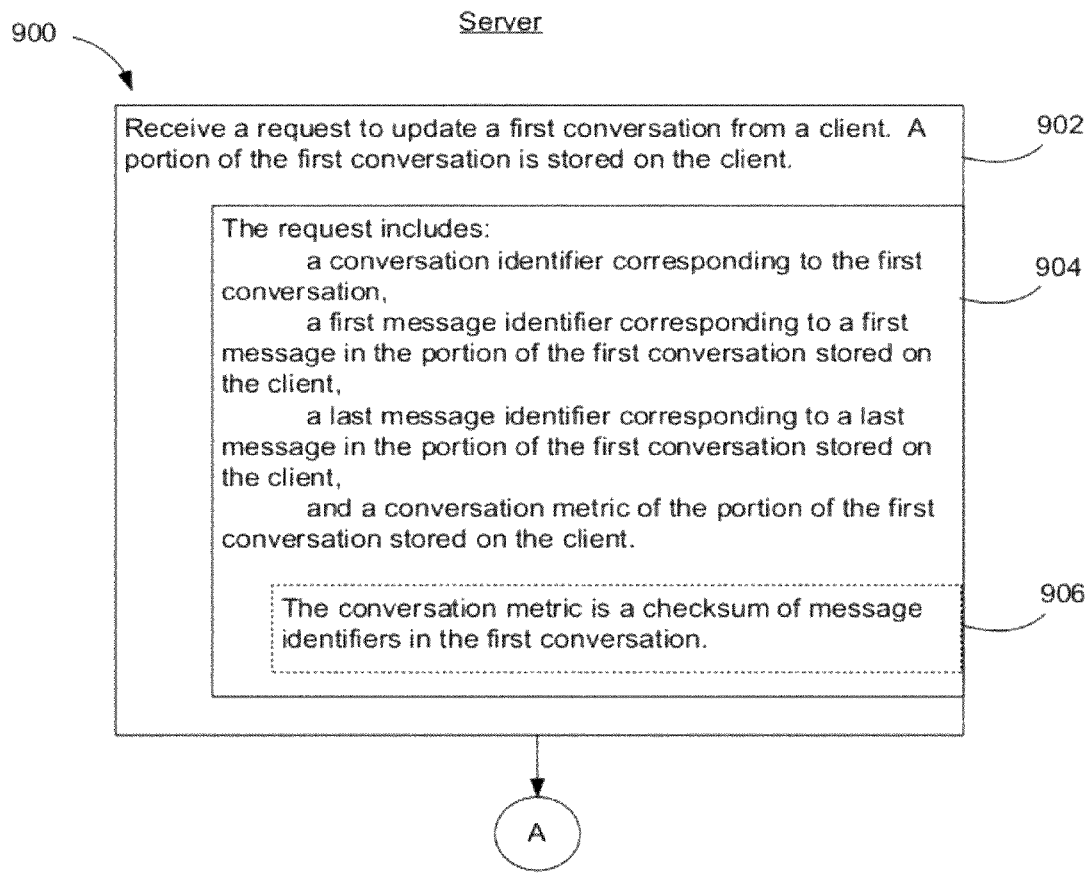
FIGS. 9A, 9B and 9C are flow charts illustrating the process of generating an update to a conversation at a server.
Figure 9B:
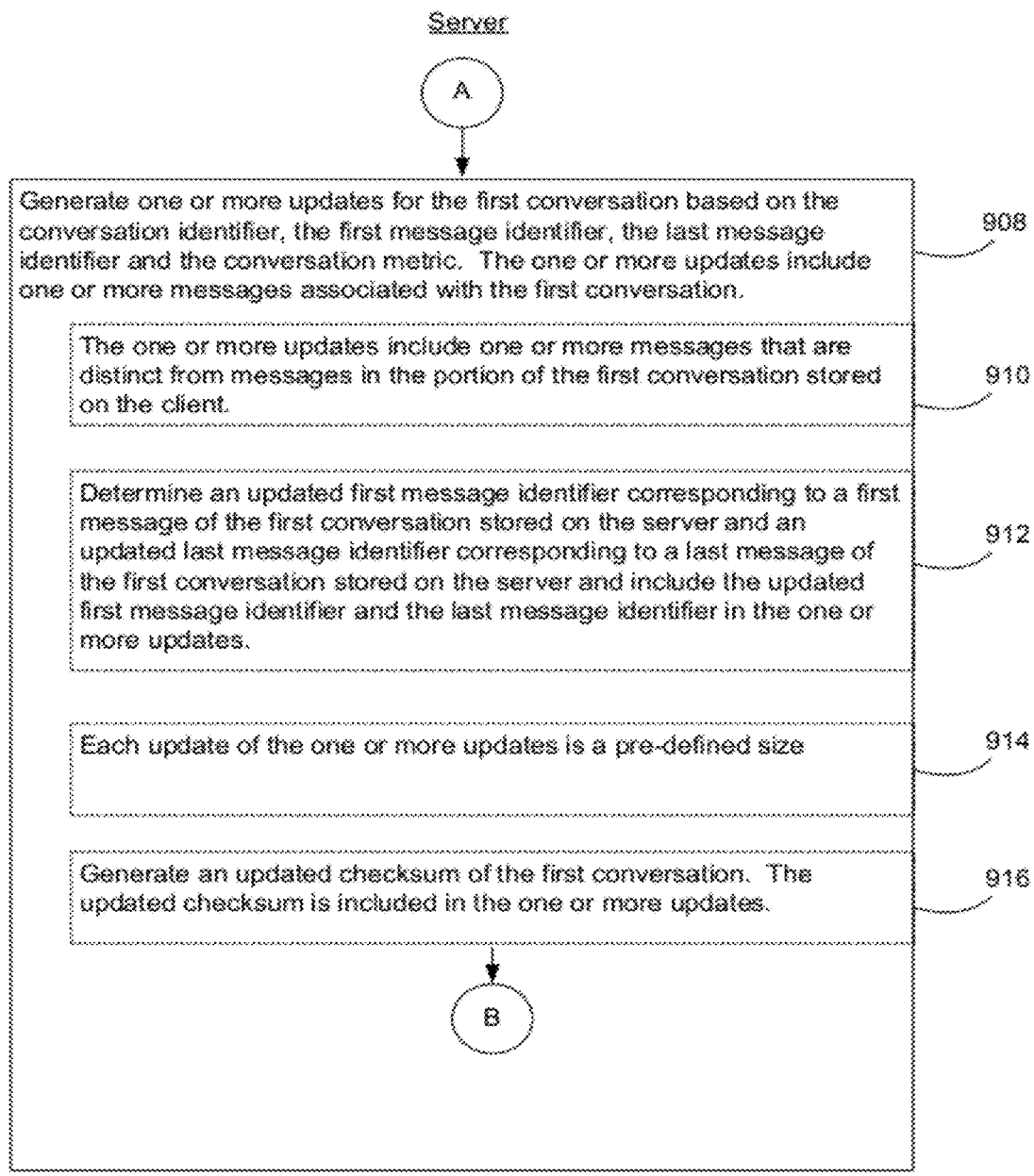
Figure 9C:
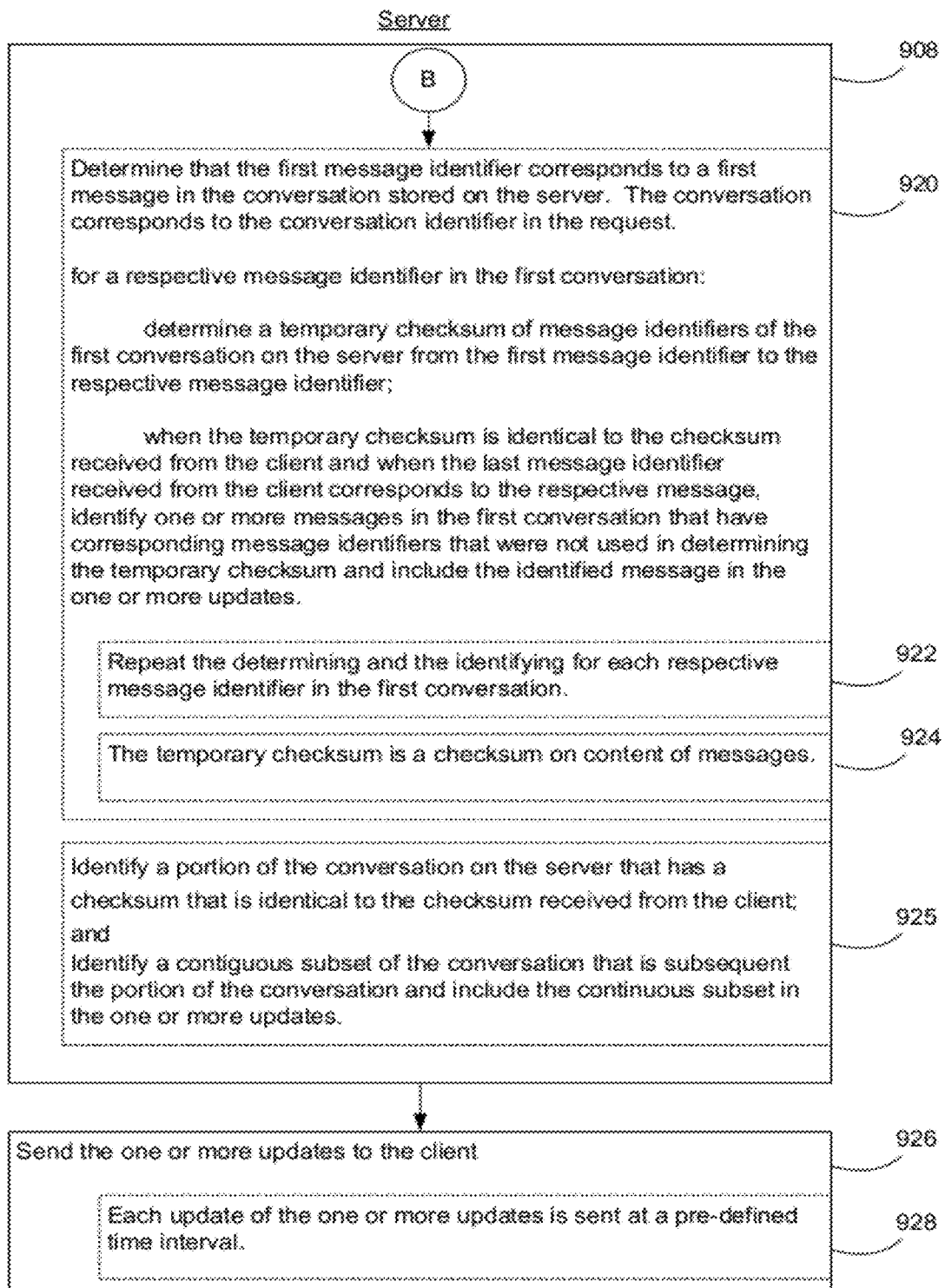
Figure 10A:
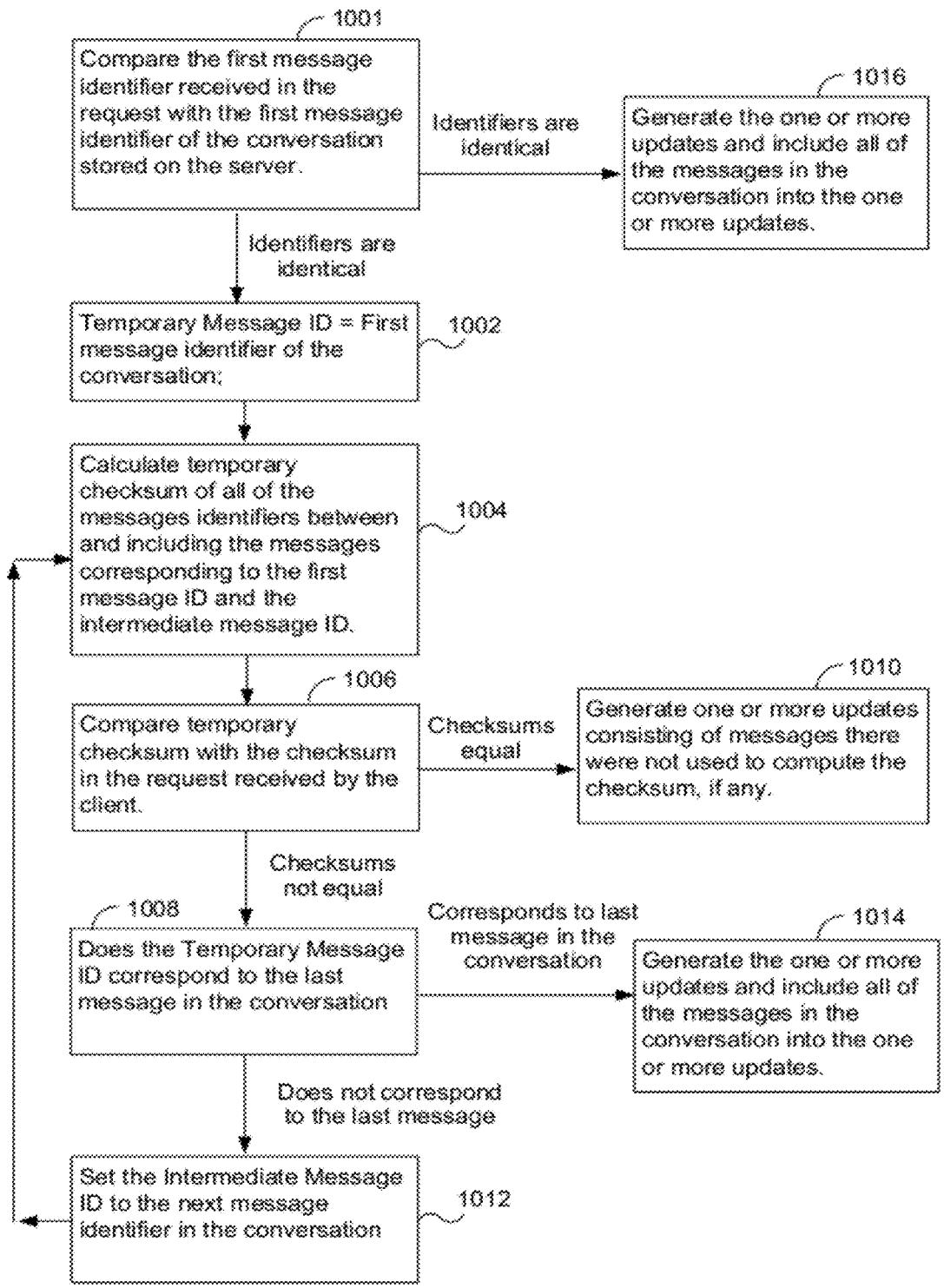
FIGS. 10A and 10B are block diagrams illustrating the process of determining what messages belong in an update.
Figure 10B:
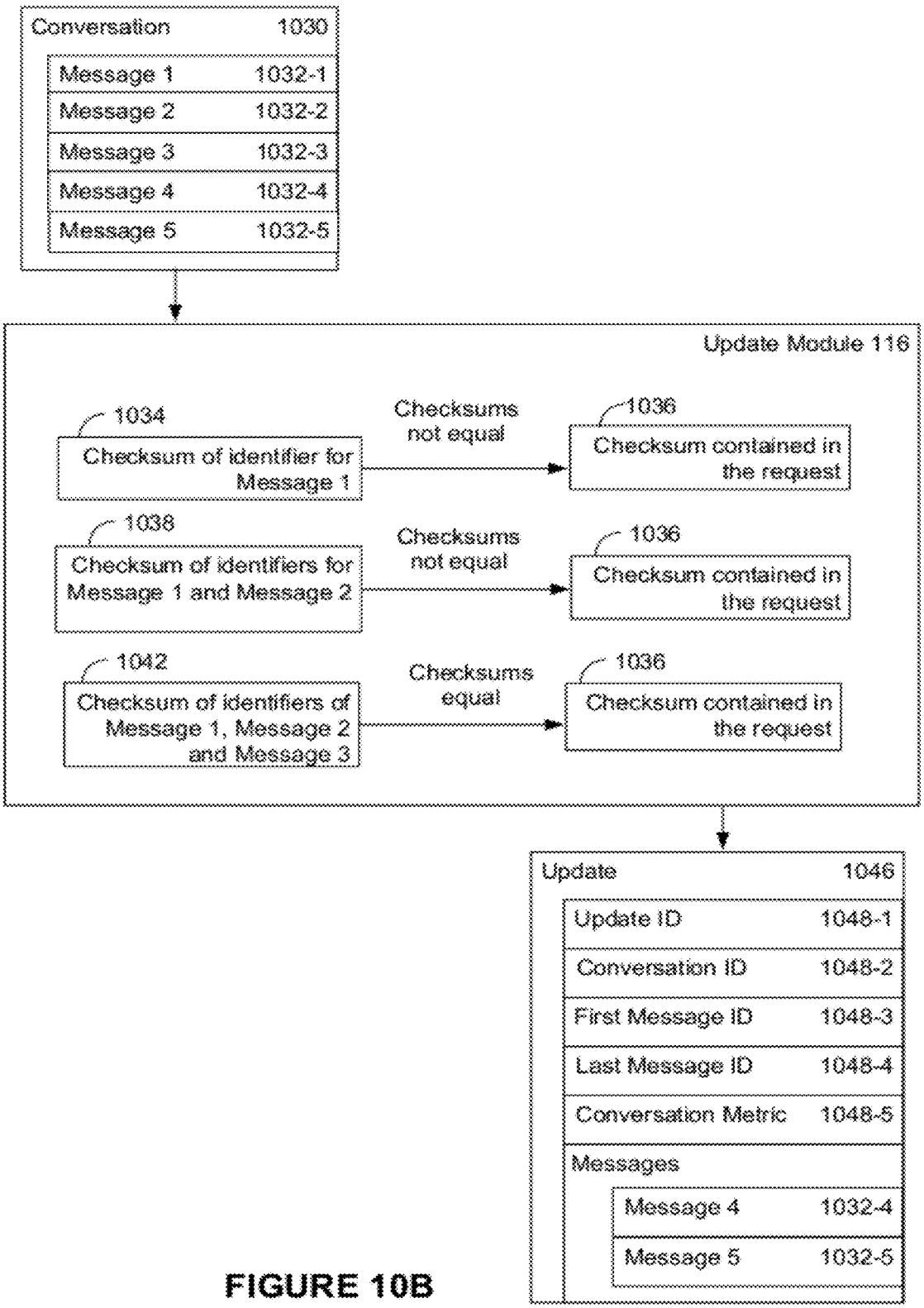

FIG. 8 is a flow diagram illustrating a method 800 of requesting and receiving an update to a conversation stored on a client 102. The method 800 is performed at a client device 102 with one or more processors and memory. FIGS. 9A, 9B and 9C illustrate a method 900 of generating one or more updates for a conversation. The method 900 is performed at a server system (e.g., server 106, FIG. 1). FIGS. 10A and 10B are block diagrams illustrating the process of determining which messages to include in the one or more updates.

FIG. 8 is a flow diagram illustrating a method 800 of requesting and receiving an update to a conversation. Method 800 is performed at a client device 102. A request (e.g., Request 440, FIG. 4B) to update a conversation stored on the client is generated at a client device (e.g., by the Request Module 335, FIG. 3). The request to update a conversation is sent to a server. (802) In some embodiments, at least a portion of the conversation corresponding to the request is stored on the client. (802) The request (e.g., Request to update a conversation 440, FIG. 4B) includes a conversation identifier corresponding to the conversation to be updated, a first message identifier corresponding to a first message in the conversation, a last message identifier corresponding to a last message of the conversation, and a conversation metric of the conversation. (804) It is noted that the information in the request (i.e., the conversation identifier, the first message identifier, the last message identifier and the conversation metric) is stored with the conversation (e.g., Email Conversation 404-1, FIG. 4A) and as a result the client retrieves the information rather than generating the information. The client does not have to expend time and resources to generate the conversation metric of the conversation. In some embodiments, the conversation metric is a checksum of message identifiers in the conversation. (806) It is noted that the conversation metric can be a checksum of any uniform subset of messages in a conversation. In some embodiments, the checksum is of every message in a conversation.

In some embodiments, the request is sent in response to user request to update a conversation. (808) In some embodiments, the request is generated and/or sent to the server 106 in response to execution of a mobile email application and without any further action by the user. In some embodiments, the request is generated and/or sent to the server 106 in response to a user's request to view the user's inbox and without any further action by the user. When the request is generated and/or sent to the server 106 in response to execution of a mobile email application or in response to a user's request to view the user's inbox, the update request is generated for a conversation in the user's inbox. In some embodiments, the conversation to be updated is the conversation containing the most recently received message or the conversation with the most messages or participants. In some embodiments, the request is generated and/or sent to the server 106 periodically and without any user initiated action.

In some embodiments, the conversation (e.g., Email Conversation 404-1, FIG. 4A) includes a conversation identifier, a header, a first message identifier, a last message identifier, a conversation metric and a plurality of messages. (812) Each message of the plurality of messages includes a message identifier, a conversation identifier, a header and content. (812)

In some embodiments, one or more updates are received from the server 106. (810) The one or more updates include one or more messages corresponding to the conversation. (810) In some embodiments, the one or more updates include one or more messages that are distinct from messages in the portion of the first conversation stored on the client. (814) Stated in another way, the client receives new messages that the client did not already have. For example, the first conversation may include two messages and the one or more updates may include three new messages that are not stored in the client. In the preceding example, the three new messages may have been received by the server 106 after the two existing messages. In some embodiments, the one or more updates include, for the conversation, an updated first message identifier, an updated last message identifier and an updated conversation metric. (815) In some embodiments, the updated values (the updated first message identifier, updated last message identifier and updated conversation metric) replace the previous values for the conversation stored on the client device. The updated values are used in subsequent update requests. In some embodiments, an entire conversation is received.

In some embodiments, the information received in the one or more updates is stored on the client device 102 (e.g., as data 338). In some embodiments, the received messages replace identical messages on the client device. In some embodiments, the received one or more messages are associated with the respective conversation stored on the client device.

In some embodiments, the conversations with one or more received messages are displayed. (816) In some embodiments, a header corresponding to the conversation is displayed with a visual indication that the conversation has been updated. To indicate the presence of new messages, the header may be bolded, italicized and show one or more icons. For example, as shown in FIG. 7A, a header 703 for a conversation may be bolded to indicate to a user that there are new unread messages in the conversation.

FIGS. 9A, 9B and 9C illustrate a method 900 of generating an update to a conversation. Method 900 is performed at a server 106. A request to update a first conversation is received from a client 102. (902) A portion of the first conversation is stored on the client 102. (902) The request includes a conversation identifier corresponding to the first conversation, a first message identifier corresponding to a first message in the portion of the first conversation stored on the client, a last message identifier corresponding to a last message in the portion of the first conversation stored on the client, and a conversation metric of the portion of the first conversation stored on the client. (904) In some embodiments, the conversation metric is a checksum of message identifiers in the conversation. (906)

One or more updates for the first conversation are generated based on the conversation identifier, the first message identifier, the last message identifier and the conversation metric. (908) The one or more updates include one or more messages associated with the first conversation. (908) In some embodiments, the one or more updates include one or more messages that are distinct from messages in the portion of the first conversation stored on the client. (910) In some embodiments, the one or more updates 460 are generated by the update module 116.

In some embodiments, generating one or more updates includes determining an updated first message identifier corresponding to a first message of the first conversation stored on the server and an updated last message identifier corresponding to a last message of the first conversation stored on the server. (912) The updated first message identifier and the last message identifier are included in the one or more updates. (912) In some embodiments, the updated first message identifier and updated last message identifier are generated by the update module 116. In some embodiments, each update of the one or more updates is a pre-defined size. (914) In some embodiments, the pre-defined size of the one or more updates are determined in accordance with user data 240 stored for a user of the client device 102 such as client device information 243 and/or transmission history 244. In some embodiments, generating the one or more updates includes generating an updated checksum of the first conversation. (916) The updated checksum is included in the one or more updates. (916) In some embodiments, the updated conversation metric is a checksum of message identifiers in the conversation. It is noted that the conversation metric can be a checksum of any portion of a conversation or even the entire conversation. In some embodiments, the checksum is determined by the metric module 222. In some embodiments, the one or more updates are generated by the updated module 116.

In order to send the minimal amount of information necessary to update a conversation, the one or more updates sent to the client include only new messages that are not already on the client device. The update module 116 of the server 106 uses the information in an update request to determine which messages of a conversation are stored on the client 102 and which messages stored on the server for the conversation are new. Stated in another way, the update module 116 uses information in an update request to synchronize the conversation stored on the client with the corresponding conversation stored on the server. As discussed above, checksums can be used to determine whether two pieces of data are identical. By comparing checksums of subsets of message identifiers of the conversation stored on the server with the checksum received in an update request from the client, the server 106 can identify which messages the client already has and which messages are needed to update the client 102.

In some embodiments, generating the one or more updates includes determining that the first message identifier in the request corresponds to a first message identifier for the conversation stored on the server. (920) The conversation corresponds to the conversation identifier in the request. (920) In some embodiments, if the first message identifier in the request does not correspond to a first message identifier for the conversation stored on the server (indicating that none of the messages of that conversation is on the client), the entire conversation is included in the one or more updates. Thus, in an atypical case where the first message identifiers do match, the entire conversation is sent to the client. In some embodiments, if the first message identifier corresponds to a first message identifier for the conversation stored on the server, a temporary checksum of message identifiers of the first conversation on the server from the first message identifier to a respective message identifier in the first conversation is determined. (920) When the temporary checksum is identical to the checksum received from the client and when the last message identifier received from the client corresponds to the respective message, one or more messages in the first conversation that have corresponding message identifiers that were not used in determining the temporary checksum are identified. (920) The identified messages are included in the one or more updates. (920) In some embodiments, the determining and the identifying are repeated for each respective message identifier in the first conversation. (922) Stated in another way, for each subset of message identifiers in the conversation, the server determines a checksum of the respective subset and compares it to the checksum received in the request from the client. If the checksums are the same, then the one or more messages in the conversation that are not in the subset are the new messages that the client does not have. If the checksums are not the same, another subset is generated and the comparisons continues until a match is found or until a checksum for all of the message identifiers in the conversation stored on the server have been compared to the checksum in the request. In the case that there is no match, the entire conversation is included in the one or more updates.

In some embodiments, the temporary checksum is a checksum on the content of messages. (924) It is noted that the checksum can be of any portion of a conversation or even the entire conversation.

In some embodiments, a portion of the conversation on the server that has a checksum that is identical to the checksum received from the client is identified and a contiguous subset of the conversation that is subsequent the portion of the conversation is identified. The continuous subset is included in the one or more updates. (925)

FIGS. 10A and 10B help illustrate the process of selecting messages to include in the one or more updates 440. The first message identifier in the received request is compared with the first message identifier of the conversation stored on the server. (1001) If the identifiers are not identical, then one or more updates are generated to include all of the messages in the conversation. (1016) Thus, in an atypical case where the first message identifiers do match, the entire conversation is sent to the client. If the identifiers are equal, an intermediate message identifier is set to the first message identifier of the conversation corresponding to the conversation identifier contained in the request. (1002) A temporary checksum is determined for all of the message identifiers between and including the messages in the conversation corresponding to the first message identifier and the intermediate message identifier. (1004) For example, as shown in FIG. 10B, a checksum 1038 may be determined for the first two messages identifiers of a conversation 1030. The temporary checksum is compared with the checksum in the request received from the client. (1006) If the checksums are equal, the one or more messages not used to generate the temporary checksum are included in the one or more updates, if any. (1010) In other words, by comparing the checksums, the messages that the client does not have are identified and included in the one or more updates. For example, as shown in FIG. 10B, the checksum 1042 of message 1, message 2 and message 3 equals the checksum 1036 received in the request and the messages (message 4 1032-4 and message 5 1032-5) that were not considered in checksum 1042 are included in the update 1046. It is noted that there may be no new messages on the server in which case no new messages are sent to the client. If the checksums are not equal, it is determined whether the temporary message identifier corresponds to the last message on the conversation stored on the server. (1008) If the temporary message identifier does not correspond to the last message of the conversation then the intermediate message identifier is set to the next message identifier in the conversation and the process loops back to block 1004. (1012) In other words, the process repeats itself until either a checksum for a subset of message identifiers of the conversation is identical to the checksum received in the update request or until a checksum of all of the message identifiers is compared to the checksum of the request. If at block 1008, the temporary message identifier corresponds to the last message in the conversation, then one or more updates are generated and all of the messages in the conversation are included in the one or more updates. The one or more updates 440 are generated by the update module 116.

Referring again to FIG. 9C, the one or more updates are sent to the client. (926) In some embodiments, each update of the one or more updates is sent to a pre-defined time interval. (925) In some embodiments, the pre-defined time interval is determined in accordance with user data 240 for the respective user of the client device 102 such as device information 243 and/or transmission history 244.

A Mechanism for Message Prefetching in an Intermittently-Connected Offline-Capable Mobile Web Application The methods described herein disclose an efficient way to update a list of conversation with a single request. An advantage of such method and system is that the mobile device does not need to send a separate update request for each conversation in a list of conversations thereby using less bandwidth, conserving battery life and decreasing update latency. Such methods may be particularly useful for mobile devices that have intermittent or unstable data connections, or have data connections with limited or expensive bandwidth.

FIG. 11 is a flow diagram illustrating a method 1100 of requesting and receiving an update to a list of conversation. The method 1100 is performed at a client device (e.g., device 102, FIG. 1) with one or more processors and memory. FIGS. 12A, 12B and 12C illustrate a method 1200 of generating one or more updates for a list of conversations. The method 1200 is performed at a server system (e.g., server 106, FIG. 1).

Figure 11A:
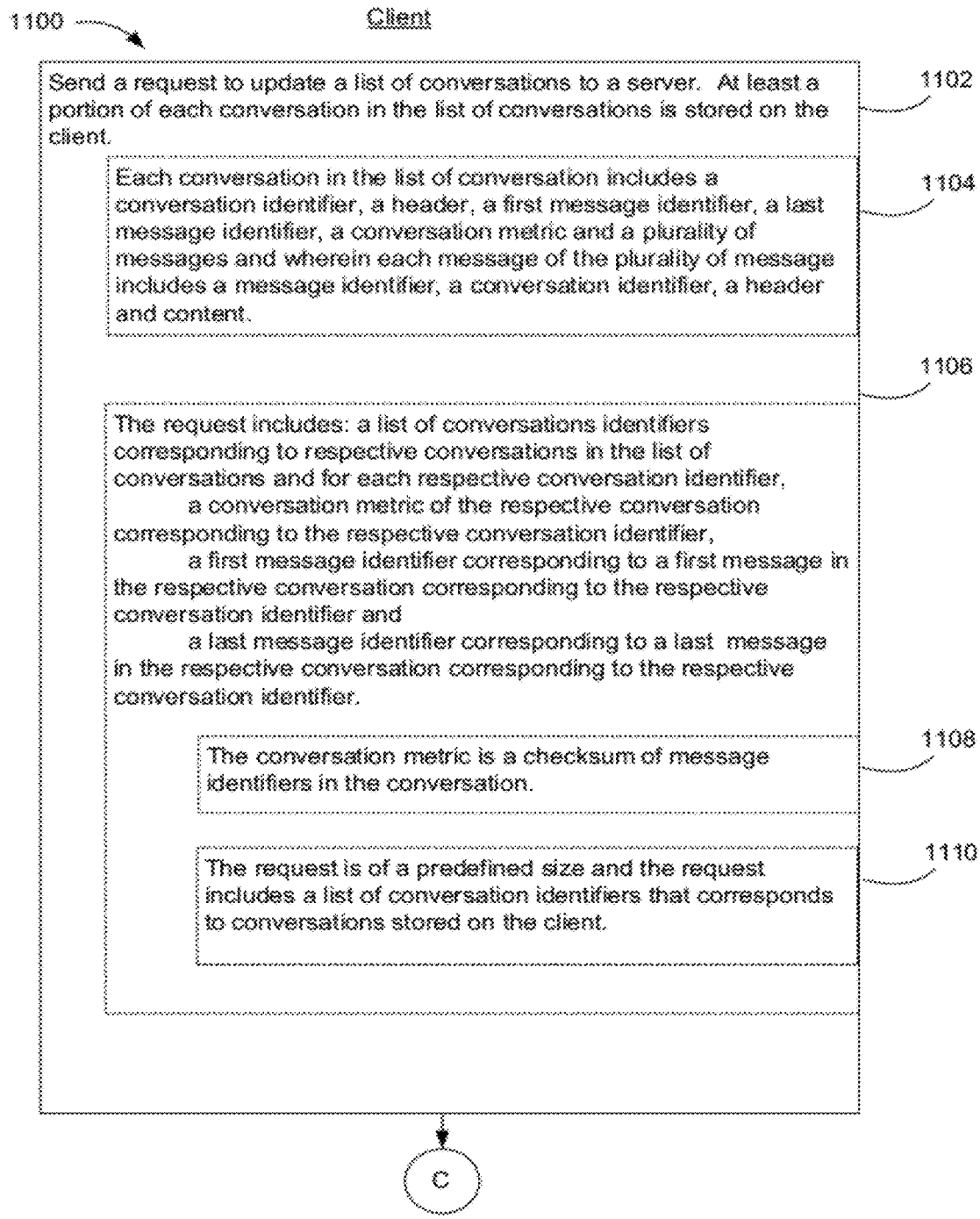
FIGS. 11A and 11B illustrate a process of requested an update of a list of conversations at a client.
Figure 11B:
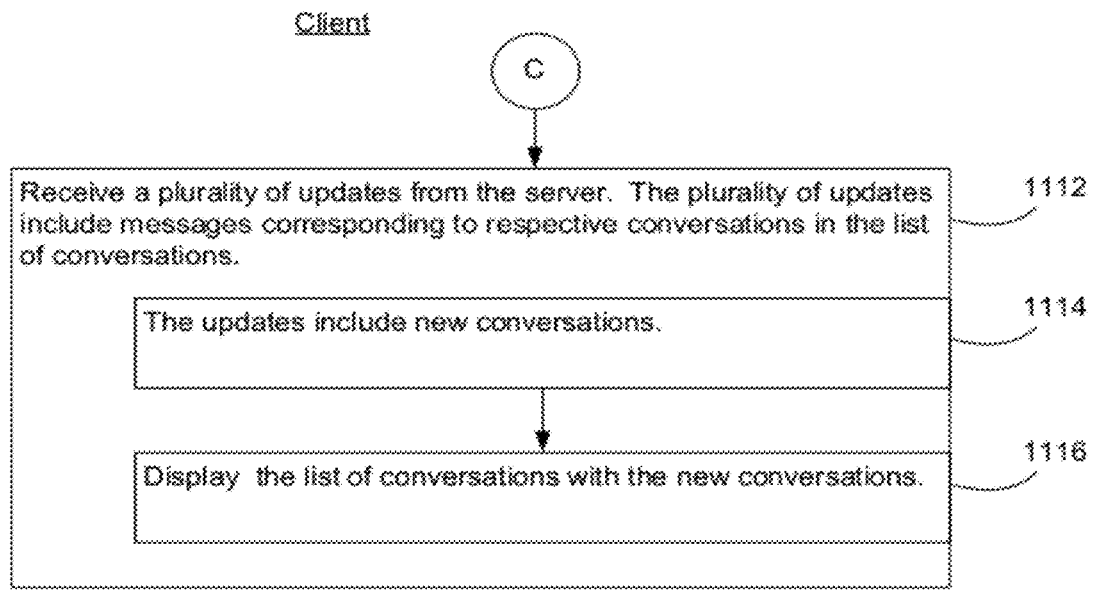
Figure 12A:
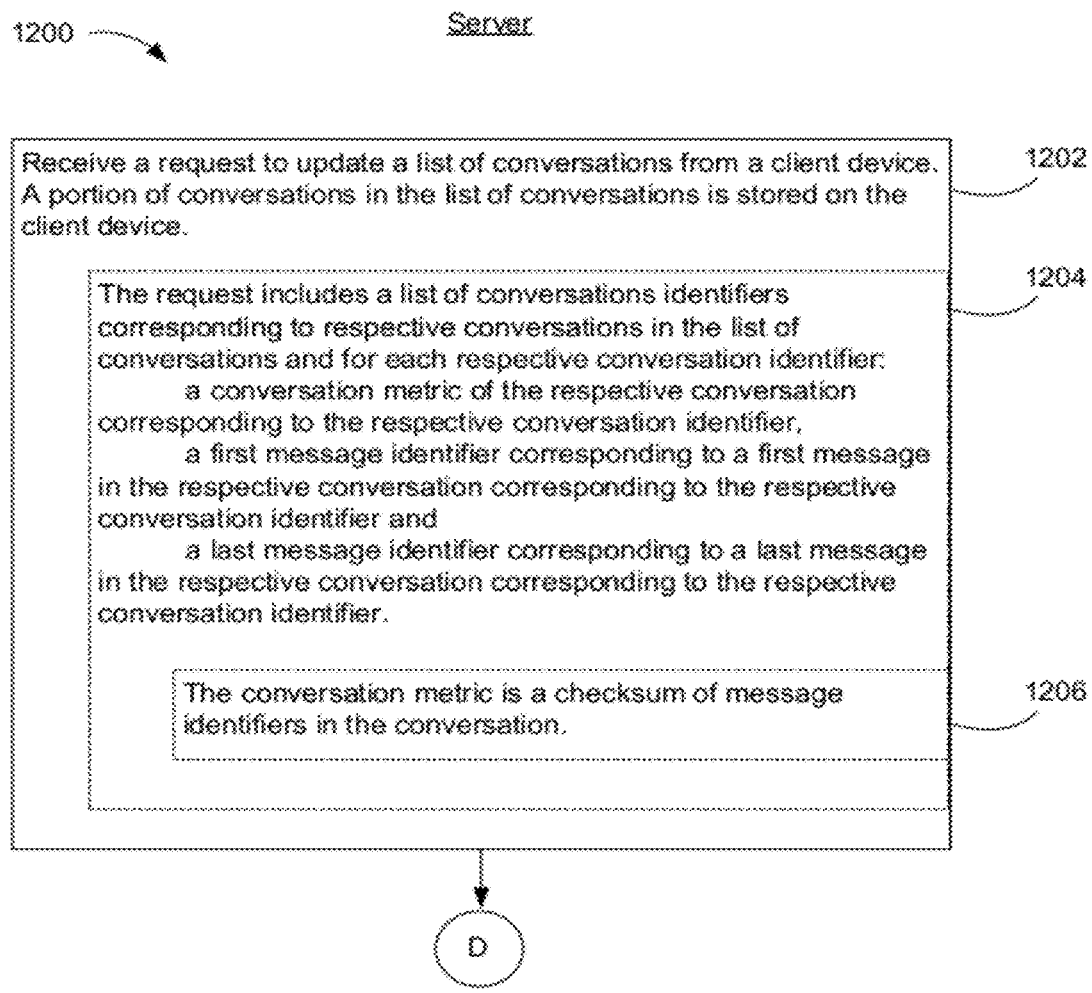
FIGS. 12A, 12B and 12C illustrate a process generating updates for a list of conversations at a server.
Figure 12B:
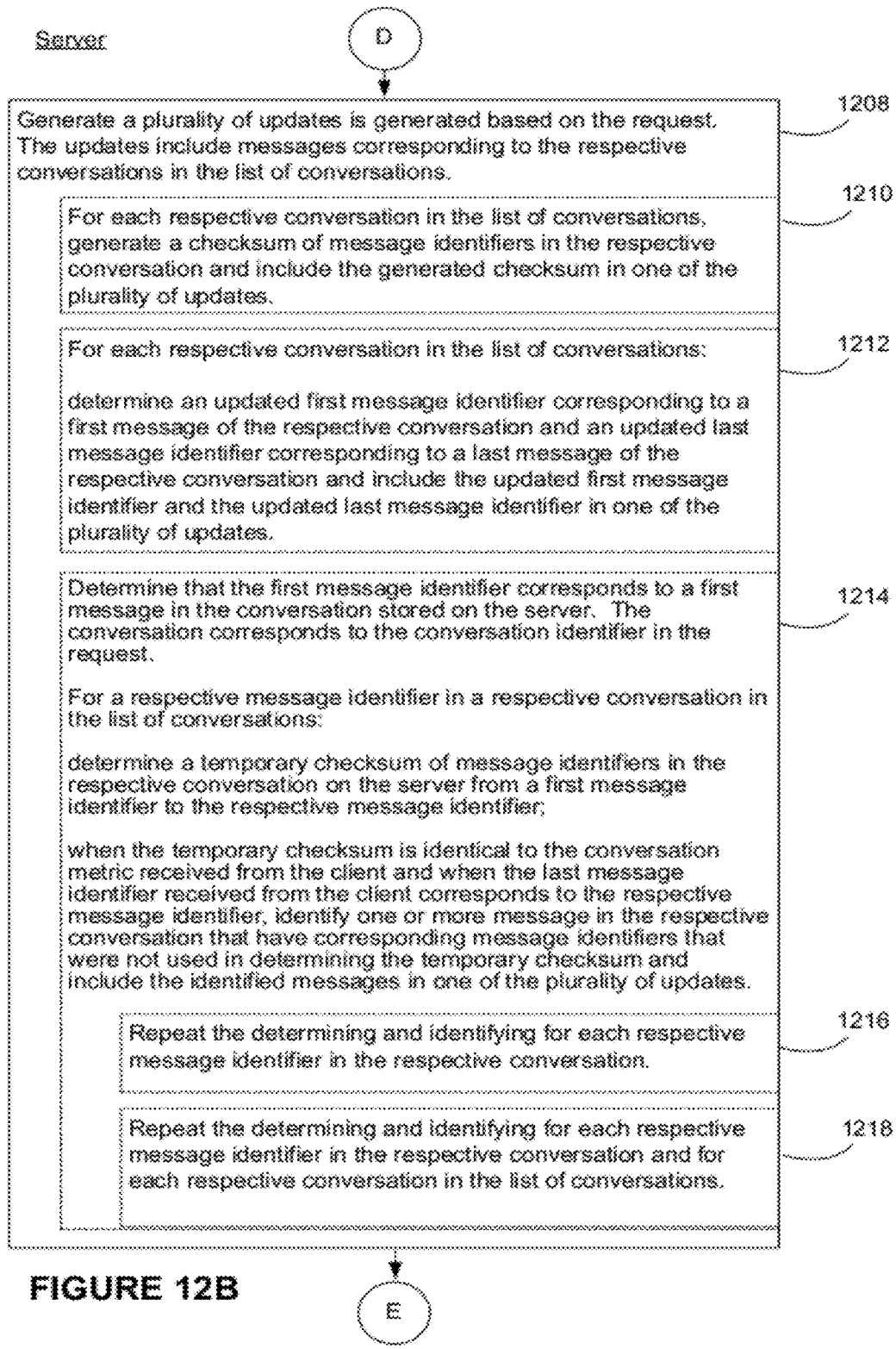
Figure 12C:
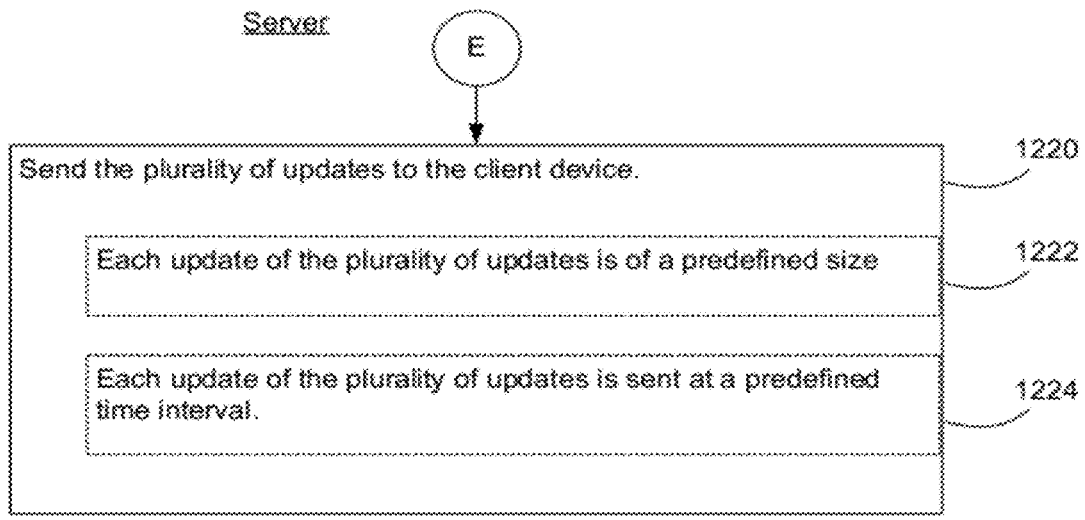

FIGS. 11A and 11B are flow diagrams illustrating a method 1100 of requesting and receiving an update to a list of conversations. The method 1100 is performed at a client system 102. A request (e.g., request to update a list of conversations 450, FIG. 4C) to update a list of conversations is generated. In some embodiments, a single request of pre-defined sized is generated. A request to update a list of conversations is sent to a server (e.g., server 106). (1102) At least a portion of each conversation in the list of conversations is stored on the client. (1102) In some embodiments, each conversation in the list of conversation includes a conversation identifier, a header, a first message identifier, a last message identifier and a conversation metric and a plurality of messages. (1104) Each message of the plurality of message includes a message identifier, a conversation identifier, a header and content. (1104) In some embodiments, the request is generated and/or sent in response to execution of a mobile email application and without any further action by the user. In other words, the request may be sent even though the user did not explicitly request an update. In some embodiments, the request to update a list of conversations 450 is generated by the request module 336.

In some embodiments, only a single update request of pre-defined size is sent to the server. In response to the single request, the client receives one or more updates. To update a list of conversations, the client device 102 does not need to generate and send a separate update request for each conversation in the list of conversations.

In some embodiments, the request includes: a list of conversations identifiers corresponding to respective conversations in the list of conversations on the client and for each respective conversation identifier, a conversation metric of the respective conversation corresponding to the respective conversation identifier, a first message identifier corresponding to a first message in the respective conversation corresponding to the respective conversation identifier and a last message identifier corresponding to a last message in the respective conversation corresponding to the respective conversation identifier. (1106) In some embodiments, the conversation metric is a checksum of message identifiers in a conversation. (1108) In some embodiments, the request is of a predefined size and the request includes a list of conversation identifiers that corresponds to conversations stored on the client. (1110) In some embodiments, the single request of pre-defined size may only be large enough to include request information for a subset of the conversations on the client device. In such a case, request information for conversations that the user is most interested in is included in the request. In some embodiments, the list of conversation identifiers corresponding to the subset of conversations stored on the client is determined in accordance with pre-defined criteria (e.g., pre-defined criteria 337) stored on the client. In some embodiments, the predefined criteria includes conversations that have unread messages, conversations with messages most recently received, conversations determined to be most active among the conversations associated with the list of conversation headers, conversations that include messages from senders in a same domain as the user of the client device, and conversations that include messages from contacts listed in the user's address book.

In some embodiments, a plurality of updates is received from the server 106. (1112) The plurality of updates includes messages corresponding to respective conversations in the list of conversations. (1112) In some embodiments, the updates include new conversations. (1114) In some embodiments, the one or more updates are saved as data 338 on the client device 102. In some embodiments, the list of conversations with the new conversations is displayed. (1116) In some embodiments, a list of conversation headers is displayed and a visual indicator is displayed with each conversation header corresponding to a conversation with one or more new messages. To indicate the presence of new messages, the header may be bolded, italicized and show one or more icons. For example, as shown in FIG. 7A, a header 703 for a conversation may be bolded to indicate to a user that there are new unread messages in the conversation.

FIGS. 12A, 12B and 12C are flow diagrams illustrating a method 1200 of generating updates for a list of conversations. Method 1200 is performed at a server 106. A request to update a list of conversations from a client device is received. (1202) A portion of conversations in the list of conversations is stored on the client device. (1202) In some embodiments, the request includes a list of conversations identifiers corresponding to respective conversations in the list of conversations. (1204) In some embodiments, the conversation identifiers corresponds to conversations that the server 106 will generate updates for. Each respective conversation identifier includes a conversation metric of the respective conversation corresponding to the respective conversation identifier, a first message identifier corresponding to a first message in the respective conversation corresponding to the respective conversation identifier and a last message identifier corresponding to a last message in the respective conversation corresponding to the respective conversation identifier. (1204) In some embodiments, the conversation metric is a checksum of message identifiers in the conversation. (1206) It is noted that the checksums can be of any portion of a conversation or even the entire conversation.

In some embodiments, a plurality of updates is generated based on the request. (1208) The updates include messages corresponding to the respective conversations in the list of conversations. (1208) The process of generating the plurality of updates is described in more detail below. In some embodiments, the plurality of updates is generated in response to receiving a single request. In some embodiments, the plurality of updates includes one or more messages that are distinct from messages in the portion of conversations stored on the client. Stated in another way, the plurality of updates include new messages that the client 102 does not already have. In some embodiments, the updates 460 are generated by the update module 116.

In some embodiments, for each respective conversation in the list of conversations, a checksum of message identifiers in the respective conversation is generated. The generated checksum is included one of the plurality of updates. (1210) In some embodiments, for each respective conversation in the list of conversations, an updated first message identifier corresponding to a first message of the respective conversation and an updated last message identifier corresponding to a last message of the respective conversation are determined. (1212) The updated first message identifier and the updated last message identifier are included in one of the plurality of updates. (1212) The updated information (i.e., updated conversation checksums and updated message identifiers) are associated with their respective conversations and sent to the client 102. In some embodiments, the updated information is generated by the update module 116. The client updates the corresponding conversations with the updated information and uses the updated information in future update requests.

In order to send the minimal amount of information necessary to update a list of conversations, the updates sent to the client include only new messages that are not already on the client device. The update module 116 of the server 106 uses the information in an update request to determine which messages of a conversation are stored on the client 102 and which messages stored on the server for the conversation are new. Stated in another way, the update module 116 uses information in the update request 440 to synchronize conversations stored on the client 102 with the corresponding conversations stored on the server 106. As discussed above, checksums can be used to determine whether two pieces of data are identical. By comparing checksums of subsets of messages of the conversation stored on the server with the checksum received in a request from the client, the server can identify which messages the client already has and which messages are needed to update the client.

In some embodiments, generating the plurality of updates includes, for a respective conversation, determining that the first message identifier in the request corresponds to a first message identifier for the conversation stored on the server. (1214) The conversation corresponds to the conversation identifier in the request. (1214) In some embodiments, if the first message identifier in the request does not correspond to a first message identifier for the respective conversation stored on the server, the entire conversation is included in the one or more updates. Thus, in an atypical case where the first message identifiers do match, the entire conversation is sent to the client. In some embodiments, if the first message identifier corresponds to a first message identifier for the conversation stored on the server, for a respective message in a respective conversation in the list of conversations, a temporary checksum corresponding to a checksum of messages of the respective conversation on the server from a first message identifier to the respective message identifier is determined. (1214) When the temporary checksum is identical to the conversation metric received from the client and when the last message identifier received from the client corresponds to the respective message identifier, one or more message in the respective conversation that were not used in determining the temporary checksum are identified. (1214) The identified messages are included in one of the plurality of updates. (1214) In some embodiments, the determining and identifying are repeated for each respective message identifier in the respective conversation. (1216) In some embodiments, the determining and identifying are repeated for each respective message identifier in the respective conversation and for each respective conversation in the list of conversations. (1218)

As discussed above, FIGS. 10A and 10B help illustrate the process of selecting messages from each conversation to include in the one or more updates.

In some embodiments, the plurality of updates is sent to the client device. (1220) In some embodiments, each update of the plurality updates is of a predefined size. (1222) In some embodiments, the pre-defined size of the one or more updates is determined in accordance with user data 240 stored for a user of the client device 102 such as client device information 243 and/or transmission history 244. In some embodiments, each update of the plurality of updates is sent at a predefined time interval. (1224) In some embodiments, the pre-defined time interval is determined in accordance with user data 240 for the respective user of the client device 102 such as device information 243 and/or transmission history 244.

Each of the methods described herein may be governed by instructions that are stored in a computer readable storage medium and that are executed by one or more processors of one or more servers (e.g., server system 106). Each of the operations shown in FIGS. 8, 9A, 9B, 9C, 10A, 11A, 11B, 12A, 12B, and 12C may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
sending, by a computing device, a request to update a list of message threads, each message thread in the list of message threads including one or more messages, wherein at least a portion of each message thread in the list of message threads is stored on the computing device, the request including a list of conversation identifiers corresponding to respective message threads in the list of message threads stored on the computing device, and wherein each respective conversation identifier of the list of conversation identifiers includes:
 a conversation metric of the respective message thread corresponding to the respective conversation identifier,
 a first message identifier corresponding to a first message in the respective message thread corresponding to the respective conversation identifier, and
 a last message identifier corresponding to a last message in the respective message thread corresponding to the respective conversation identifier; and
receiving, at the computing device, a plurality of updates to a plurality of message threads in the list of message threads, wherein the plurality of updates includes new messages corresponding to respective message threads in the list of message threads.

2. The method of claim 1, wherein the conversation metric is a checksum of message identifiers in the message thread.

3. The method of claim 1, wherein the request is of a predefined size and the request includes a list of conversation identifiers that corresponds to message threads stored on the computing device.

4. The method of claim 1, wherein each message thread in the list of message threads includes a conversation identifier, a header, a first message identifier, a last message identifier, a conversation metric and a plurality of messages, and wherein each message of the plurality of message includes a message identifier, a conversation identifier, a header, and content.

5. The method of claim 4, wherein the conversation metric is a checksum of the message identifiers in the respective message thread.

6. The method of claim 1, wherein the updates include new message threads.

7. The method of claim 6, further comprising outputting, for display, by the computing device, the list of message threads with the new message threads.

8. A method, comprising:
receiving, at first a computing device, from a second computing device, a request to update a list of message threads, each message thread in the list of message threads including one or more messages, wherein a portion of the message threads in the list of message threads is stored on the second computing device, the request including a list of conversation identifiers corresponding to respective message threads in the list of message threads stored on the second computing device, and wherein each respective conversation identifier includes:
 a conversation metric of the respective message thread corresponding to the respective conversation identifier,
 a first message identifier corresponding to a first message in the respective message thread corresponding to the respective conversation identifier, and
 a last message identifier corresponding to a last message in the respective message thread corresponding to the respective conversation identifier;
generating, by the first computing device, based on the request to update the list of message threads, a plurality of updates to a plurality of message threads in the list of message threads, wherein the plurality of updates includes new messages corresponding to the respective message threads in the list of message threads; and
sending, by the first computing device, to the second computing device, the plurality of updates.

9. The method of claim 8, wherein the conversation metric is a checksum of message identifiers in the respective message thread.

10. The method of claim 8, wherein generating the plurality of updates to the plurality of message threads in the list of message threads includes, for each respective message thread in the list of message threads, generating a checksum of message identifiers in the respective message thread and including the generated checksum in one of the plurality of updates.

11. The method of claim 8, wherein generating the plurality of updates to message threads in the list of message threads includes, for each respective message thread in the list of message threads:
  determining, by the first computing device, an updated first message identifier corresponding to a first message of the respective message thread and an updated last message identifier corresponding to a last message of the respective message thread and including the updated first message identifier and the updated last message identifier in one of the plurality of updates.

12. The method of claim 8, wherein generating the plurality of updates to message threads in the list of message threads includes:
  determining, by the first computing device, that the first message identifier corresponding to a first message in the message thread stored on the second computing device corresponds to the conversation identifier in the request; and
  for a respective message identifier in a respective message thread in the list of message threads,
    determining, by the first computing device, a temporary checksum of message identifiers in the respective message thread on the server from a first message identifier to the respective message identifier, and
    responsive to determining, by the first computing device, that the temporary checksum is identical to the conversation metric received from the client, and that the last message identifier received from the client corresponds to the respective message identifier, identifying, by the first computing device, one or more messages in the respective message thread that have corresponding message identifiers not used in determining the temporary checksum and including the identified messages in one of the plurality of updates.

13. The method of claim 12, wherein the determining and identifying are repeated for each respective message identifier in the respective message thread.

14. The method of claim 13, wherein the determining and identifying are repeated for each respective message identifier in the respective message thread and for each respective message thread in the list of message threads.

15. The method of claim 8, wherein each update of the plurality of updates is of a predefined size.

16. The method of claim 8, wherein each update of the plurality of updates is sent at a predefined time interval.

17. A non-transitory computer readable storage medium storing instructions that, when executed by at least one processor of a computing device, cause the computing device to perform a method comprising:
  sending a request to update a list of message threads, each message thread in the list of message threads including one or more messages, wherein at least a portion of each message thread in the list of message threads is stored on the computing device, the request including a list of conversation identifiers corresponding to respective message threads in the list of message threads stored on the computing device, and wherein each respective conversation identifier of the list of conversation identifiers includes:
    a conversation metric of the respective message thread corresponding to the respective conversation identifier,
    a first message identifier corresponding to a first message in the respective message thread corresponding to the respective conversation identifier, and
    a last message identifier corresponding to a last message in the respective message thread corresponding to the respective conversation identifier; and
  receiving a plurality of updates, to a plurality of message threads in the list of message threads, wherein the plurality of updates includes new messages corresponding to respective message threads in the list of message threads.

18. A system comprising:
  at least one processor;
  at least one memory in communication with the at least one processor and configured to store data and instructions that, when executed by the at least one processor, cause the system to:
  send a request to update a list of message threads, each message thread in the list of message threads including one or more messages, wherein at least a portion of each message thread in the list of message threads is stored in the at least one memory, the request including a list of conversation identifiers corresponding to respective message threads in the list of message threads stored on the computing device, and wherein each respective conversation identifier of the list of conversation identifiers includes:
    a conversation metric of the respective message thread corresponding to the respective conversation identifier,
    a first message identifier corresponding to a first message in the respective message thread corresponding to the respective conversation identifier, and
    a last message identifier corresponding to a last message in the respective message thread corresponding to the respective conversation identifier; and
  receive a plurality of updates to a plurality of message threads in the list of message threads, wherein the plurality of updates includes new messages corresponding to respective message threads in the list of message threads.

19. A non-transitory computer readable storage medium storing instructions that, when executed by at least one processor of a first computing device, cause the first computing device to perform a method comprising:
  receiving, at the first computing device, from a second computing device, a request to update a list of message threads, each message thread in the list of message threads including a plurality of messages, wherein a portion of the message threads in the list of message threads is stored on the second computing device, the request including a list of conversation identifiers corresponding to respective message threads in the list of message threads stored on the computing device, and wherein each respective conversation identifier of the list of conversation identifiers includes:
    a conversation metric of the respective message thread corresponding to the respective conversation identifier,
    a first message identifier corresponding to a first message in the respective message thread corresponding to the respective conversation identifier, and
    a last message identifier corresponding to a last message in the respective message thread corresponding to the respective conversation identifier;
  generating, by the first computing device, based on the request to update the list of message threads, a plurality of updates to a plurality of message threads in the list of message threads, wherein the plurality of updates includes new messages corresponding to the respective message threads in the list of message threads; and sending, by the first computing device, to the second computing device, the plurality of updates.

* * * * *